(12) United States Patent
Driscoll et al.

(10) Patent No.: US 11,981,477 B2
(45) Date of Patent: May 14, 2024

(54) STORAGE CONTAINER WITH ATTACHABLE TIMER DISC

(71) Applicants: Charles R. Driscoll, Downingtown, PA (US); Rachelle L. Driscoll, Downingtown, PA (US)

(72) Inventors: Charles R. Driscoll, Downingtown, PA (US); Rachelle L. Driscoll, Downingtown, PA (US)

( * ) Notice: Subject to any disclaimer, the term of this patent is extended or adjusted under 35 U.S.C. 154(b) by 853 days.

(21) Appl. No.: 17/078,952

(22) Filed: Oct. 23, 2020

(65) Prior Publication Data

US 2021/0122529 A1    Apr. 29, 2021

Related U.S. Application Data

(60) Provisional application No. 62/924,838, filed on Oct. 23, 2019.

(51) Int. Cl.
*B65D 25/20* (2006.01)
*H01H 43/02* (2006.01)

(52) U.S. Cl.
CPC ........... *B65D 25/20* (2013.01); *H01H 43/028* (2013.01); *B65D 2203/00* (2013.01)

(58) Field of Classification Search
CPC ............... B65D 90/48; B65D 2201/00; B65D 2203/00; B65D 2203/02; B65D 2203/10; B65D 2203/12; B65D 55/028; B65D 79/02; B65D 81/24; B65D 2251/00; B65D 2251/0003; B65D 2251/023; B65D 2255/00; B65D 2255/20; B65D 51/245; B65D 51/24; B65D 51/248; B65D 3/00; B65D 3/10; B65D 3/16; B65D 3/18; B65D 3/20; B65D 23/00; B65D 23/006; B65D 23/008; B65D 23/0857; B65D 90/00; B65D 90/0006; B65D 90/0013; B65D 90/002; B65D 90/58; B65D 90/582; B65D 90/64; B65D 25/20; H01H 43/00; H01H 43/028
USPC ....................................................... 200/38 R
See application file for complete search history.

(56) References Cited

U.S. PATENT DOCUMENTS

| 11,617,460 B2 * | 4/2023 | Elsokary | ............ A47G 19/2227 340/618 |
| 2015/0122688 A1 * | 5/2015 | Dias | ..................... A47G 19/027 206/459.1 |

* cited by examiner

*Primary Examiner* — Anthony R Jimenez
(74) *Attorney, Agent, or Firm* — Weaver IP L.L.C.

(57) ABSTRACT

A storage container that comprises a base, lid and a timer disc that is removably attachable to the lid. The lid comprises a top surface having a circular recess formed thereon and one or more first mating elements disposed within the circular recess. The timer disc comprises a housing that encapsulates a display, a microcontroller, and a battery, and one or more second mating elements. The timer disc is manipulable to cause the one or more second mating elements to engage with the one or more first mating elements, thereby securing the timer disc to the lid. The manipulation of the timer disc to cause the one or more second mating elements to engage with the one or more first mating elements also causes an electrical connection to be made between the battery and each of the microcontroller and the display, thereby activating the microcontroller and the display.

20 Claims, 22 Drawing Sheets

STORAGE CONTAINER WITH ATTACHABLE TIMER DISC

CROSS-REFERENCE TO RELATED APPLICATIONS

This application claims priority to U.S. Provisional Patent Application Ser. No. 62/924,838, filed Oct. 23, 2019, the entirety of which is incorporated by reference herein.

BACKGROUND

When storing food, it is extremely useful to know how long a particular food item has been stored so that a determination can be made as to whether the food is still fit for consumption. This is especially true if the food item is not stored in a commercial container marked with an expiration date by a producer or merchant of the food item. Conventional food storage containers designed for household and/or commercial use do not provide a built-in and easy-to-use means for tracking how long food has been stored therein. Food items can be marked with hand-made labels but creating such labels and attaching them to food storage containers is a time-consuming and burdensome task, and it is possible that an error may be made during the labelling process or that a label may fall off. If a consumer/merchant does not know how long a particular food item has been stored, they may either choose to dispose of the food item to avoid eating/serving bad food or they may actually consume/sell the food item. If the consumer/merchant chooses to dispose of the food item, this can result in waste if the food item is actually still good. If the consumer/merchant chooses to consume/sell the food item, this can be a serious health hazard if the food item has gone bad.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A storage container is described herein that comprises a base, lid and a timer disc that is removably attachable to the lid. The lid comprises a top surface having a circular recess formed thereon and one or more first mating elements disposed within the circular recess. The timer disc comprises a housing that encapsulates a display, a microcontroller, and a battery, and one or more second mating elements. The timer disc is manipulable to cause the one or more second mating elements to engage with the one or more first mating elements, thereby securing the timer disc to the lid. The manipulation of the timer disc to cause the one or more second mating elements to engage with the one or more first mating elements also causes an electrical connection to be made between the battery and each of the microcontroller and the display, thereby activating the microcontroller and the display. The timer disc is further manipulable to cause the one or more second mating elements to disengage from the one or more first mating elements, thereby deactivating the microcontroller and the display and enabling the timer disc to be removed from the lid.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein

BRIEF DESCRIPTION OF THE DRAWINGS/FIGURES

The accompanying drawings, which are incorporated herein and form part of the specification, illustrate embodiments of the application and, together with the description, further serve to explain the principles of the embodiment and to enable a person skilled in the relevant art(s) to make and use the embodiments.

Figure 1:
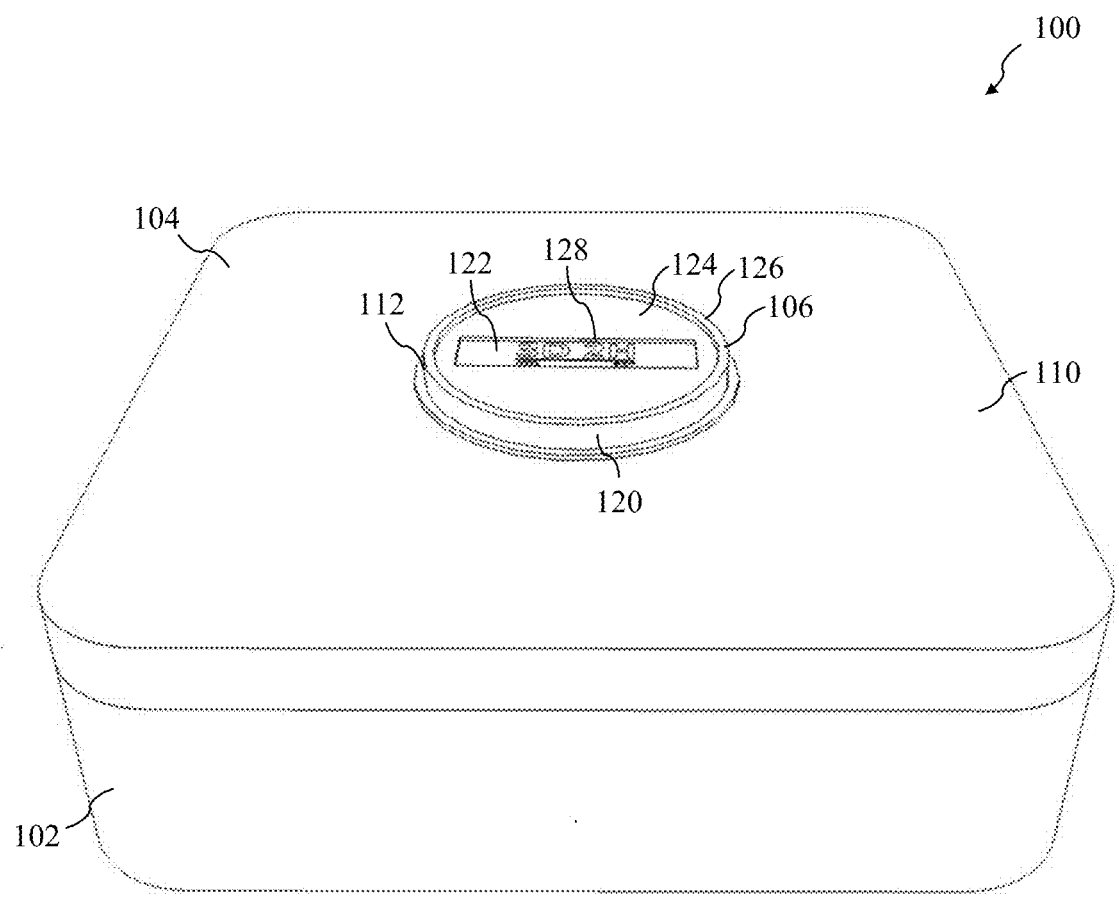
FIG. 1 is a top perspective view of a storage container that includes a base, a lid, and a timer disc that attaches to the lid, in accordance with an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Storage Container with Attachable Disc Timer in Accordance with Embodiments FIG. 1 is a top perspective view of a storage container 100 that includes a base 102, a lid 104, and a timer disc 106 that attaches to lid 104 in accordance with an embodiment. Base 102 and lid 104 can be used for storage without timer disc 106. However, timer disc 106 is intended to be used with lid 104.

Base 102 comprises a container (e.g., bin, tub, cup, etc.) with an open top to which lid 104 attaches via any known attachment mechanism (e.g., snap-fit, screw-top, hook clamp, etc.). Base 102 and lid 104 may each be formed of any suitable material including plastic, glass, or metal, or some combination thereof. Lid 104 comprises a top surface 110 that has a circular recess 112 formed thereon. One or more mating elements of lid 104 are disposed within circular recess 112 and are specially adapted to enable timer disc 106 to be removably attached to lid 104 and also to facilitate activation and deactivation of timer disc 106.

Timer disc 106 comprises a housing 120 that encapsulates a display 122 as well as other components. Housing 120 includes a top surface 124 that includes an aperture 128 formed therein via which display 122 is externally visible to a user. Top surface 124 also comprises a raised outer edge 126 that enables the top of timer disc 106 to interlock with a bottom surface of any other timer disc designed in a like manner to timer disc 106, thereby facilitating stacking of multiple timer discs.

Figure 2:
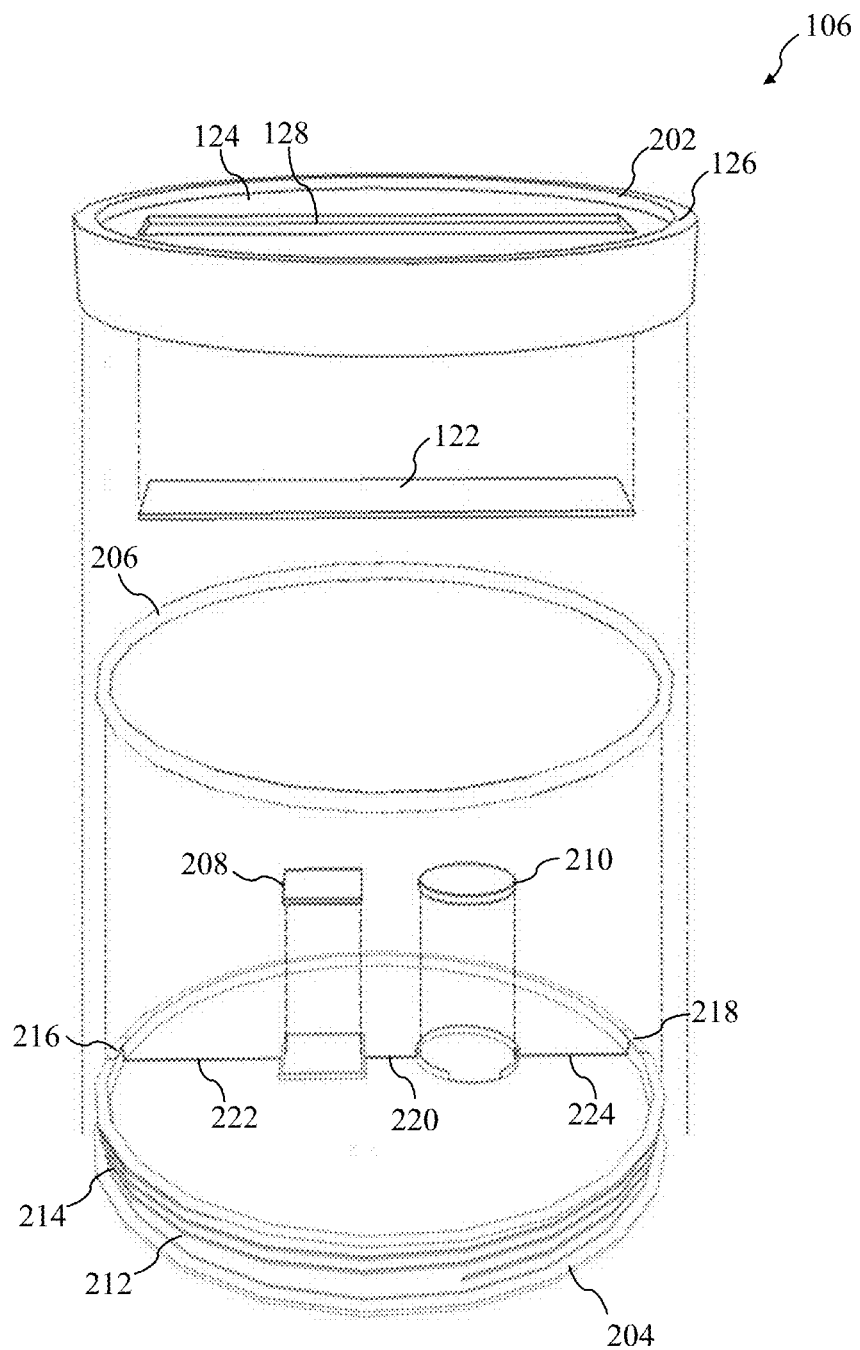
FIG. 2 is an exploded perspective view of the timer disc of FIG. 1.

FIG. 2 is an exploded perspective view of timer disc 106. As shown in FIG. 2, housing 120 of timer disc 106 comprises a top housing 202 and a bottom housing 204. Top housing 202 is rotatably connectable to bottom housing 204 via a threaded connection therebetween. Although a threaded connection between top housing 202 and bottom housing 204 is indicated in this example, persons skilled in the art will readily appreciate that other types of connections may be used (e.g., mechanical, magnetic, or otherwise).

Top housing 202 accommodates display 122 while bottom housing 204 accommodates a microcontroller 208 and a battery 210. When top housing 202 is connected to bottom housing 204, housing 120 encapsulates display 122, microcontroller 208 and battery 210. Top housing 202 and bottom housing 204 may each be formed of a plastic material (e.g., a hard plastic material), although this is only an example and other suitable materials may be used to form these components.

As further shown in FIG. 2, microcontroller 208 and battery 210 are connected to each other via a conductive element 220. Microcontroller 208 is also connected via a conductive element 222 to an electrical contact 216 that is disposed at a first location on top of a cylindrical outer edge 212 of bottom housing 204. Battery 210 is also connected via a conductive element 224 to an electrical contact 218 that is disposed at a second location on top of cylindrical outer edge 212 of bottom housing 204.

As still further shown in FIG. 2, timer disc 106 comprises an elastic ring 206 that surrounds cylindrical outer edge 212 of bottom housing 204 and is thereby disposed between top housing 202 and bottom housing 204. In an embodiment, elastic ring 206 is made from silicone, rubber or other suitable material that will deform under pressure and then resume its original shape when such pressure is removed. As will be discussed in more detail herein, elastic ring 206 is compressed when a user rotates top housing 202 downward onto bottom housing 204. This downward compression causes elastic ring 206 to extend outward from the sides of timer disc 106 and form a seal with the sidewalls of circular recess 112 within lid 104 of storage container 100.

Display 122 is configured to display an elapsed time (e.g., a number of days and hours) since timer disc 106 became active (which may be when food was first stored in storage container 100). Display 122 is electrically connectable to microcontroller 208 and may be controlled thereby in a well-known manner to cause such elapsed time information to be displayed. Display is also electrically connectable to battery 210 and may be powered thereby. Depending upon the implementation, display 122 may alternatively or additionally receive power from microcontroller 208.

In one embodiment, display 122 comprises a liquid-crystal display (LCD). However, other display technologies may alternatively be used to implement display 122. For example and without limitation, display 122 may be implemented using any one of electronic paper, e-ink, vacuum fluorescent displays (VFDs), light-emitting diode (LED), OLED (organic light-emitting diode), AMOLED (active-matrix organic light-emitting diode), IPS-LCD (in-plane switching liquid crystal display), cathode ray tube display (CRT), electroluminescent display (ELD), plasma display panel (PDP), quantum dot (QLED) display, thin-film transistor display (TFT), high-performance addressing display (HPA), surface-conduction electron-emitter display (SED), digital light processing display (DLP), field emission display (FED), laser TV (forthcoming), carbon nanotubes, interferometric modulator display (IMOD), or digital micro-shutter display (DMS).

Figure 3A:
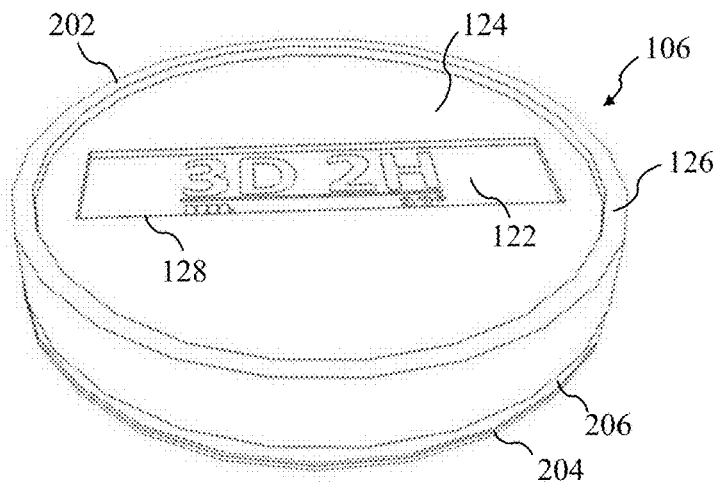
FIG. 3A is a top perspective view of the timer disc of FIG. 1.

FIG. 3A is a top perspective view of timer disc 106. As shown in FIG. 3A, top surface 124 of top housing 202 includes aperture 128 in which display 122 is viewable and/or disposed. It will be understood to persons skilled in the art that such aperture may have other shapes to accommodate displays having other shapes. As noted above, top surface 124 also comprises raised outer edge 126 that enables the top of timer disc 106 to hold a bottom surface of another timer disc, thereby facilitating stacking of multiple timer discs.

As previously noted, when timer disc 106 is powered on, display 122 displays an elapsed time since timer disc 106 was activated, which may represent a time at which food was stored in storage container 100. The elapsed time may be shown in any suitable increments (e.g., days, hours, minutes, seconds, etc.) and in any suitable format. Display 122 may also display other information, including but by no means limited to a current date (in any suitable format), a current time (in any suitable format), a temperature, a battery life indicator associated with battery 210, an indicator associated with a wireless signal or a connection between timer disc 106 and an external device or network (e.g., an indicator associated with a Bluetooth, WiFi or Telecom network signal or connection with an external device or network).

Figure 3B:
FIG. 3B is a side view of the timer disc of FIG. 1 when an elastic ring thereof is in a decompressed state.

FIG. 3B is a side view of timer disc 106 when elastic ring 206 is in a decompressed state. When timer disc 106 is separate from lid 104 of storage container 100, elastic ring 206 is decompressed. While in its decompressed state, elastic ring 206 is substantially flush with the outermost sides of top housing 202 and bottom housing 204 as can be seen in FIG. 3B.

Figure 3C:
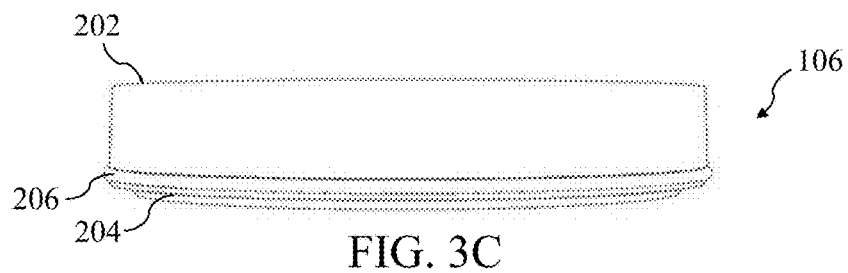
FIG. 3C is a side view of the timer disc of FIG. 1 when an elastic ring thereof is in a compressed state due to rotation of a top housing thereof onto a bottom housing thereof via a threaded connection therebetween.

FIG. 3C is a side view of timer disc 106 when elastic ring 206 is in a compressed state. As will be discussed herein, attaching timer disc 106 to lid 104 involves rotating top housing 202 onto bottom housing 204 via the threaded connection therebetween while timer disc is inserted into circular recess 112 of lid 104. As noted above, elastic ring 206 is made from silicone, rubber, or other suitable material that will squeeze out from the side of timer disc 106 when top housing 202 is rotated sufficiently onto bottom housing 204, thereby causing elastic ring 206 to press against the side walls of circular recess 112 within lid 104. This pressure will keep timer disc 106 securely attached to lid 104.

Figure 3D:
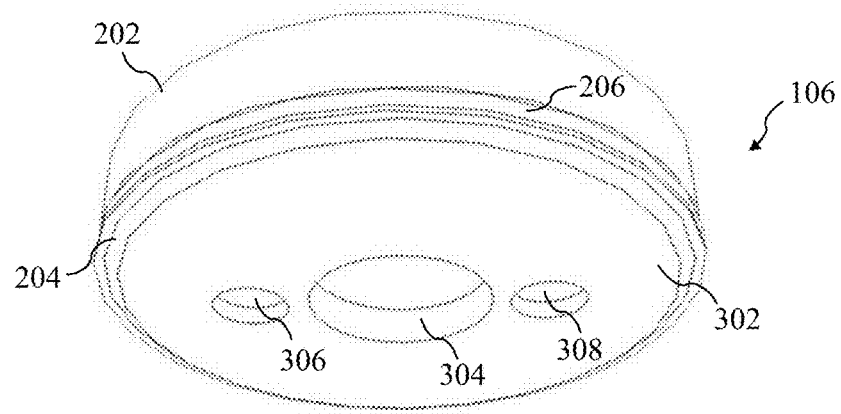
FIG. 3D is a bottom perspective view of the timer disc of FIG. 1.

FIG. 3D is a bottom perspective view of timer disc 106. As shown in FIG. 3D, a bottom surface 302 of bottom housing 204 includes an inverted place holder 304, a bottom housing connector 306, and a bottom housing connector 308, each of which is in the form of a circular recess. Inverted place holder 304 acts as female connection to a male piece disposed within circular recess 112 on lid 104 and is used to align timer disc 106 to lid 104, holding bottom housing 204 in place. Bottom housing connectors 306 and 308 engage with a key disposed within circular recess 112 to allow the twisting of top housing 202, as will be further described herein.

Figure 4A:
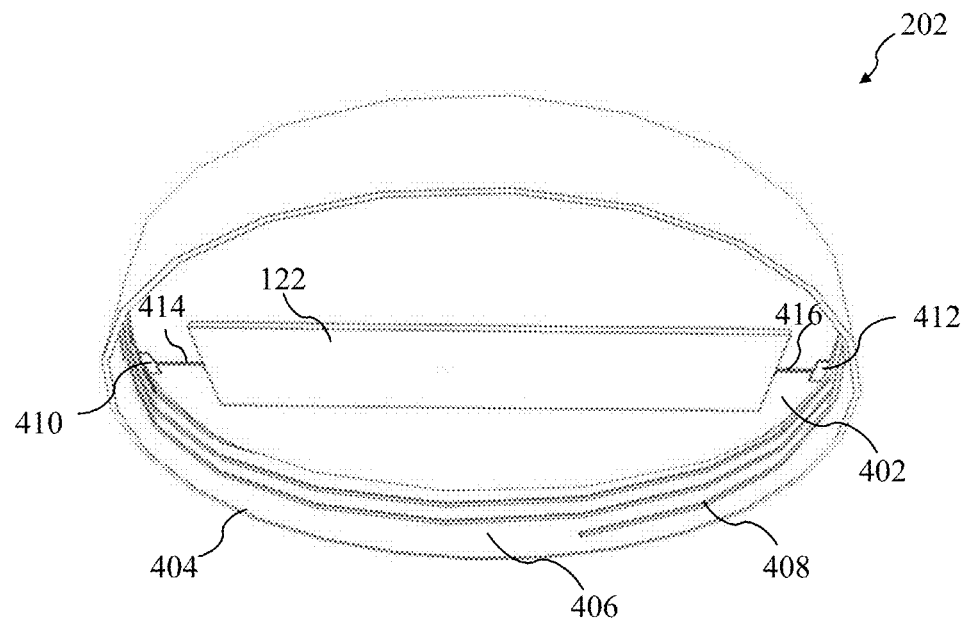
FIG. 4A is a bottom perspective view of the top housing of the timer disc of FIG. 1.

FIG. 4A is a bottom perspective view of top housing 202 of timer disc 106. As shown in FIG. 4A, top housing 202 includes a bottom surface 402 upon which is disposed an electrical contact 410 in a first location and an electrical contact 412 in a second location. A conductive element 414 that is disposed on bottom surface 402 connects display 122 to electrical contact 410 and a conductive element 416 that is disposed on bottom surface 402 connects display 122 to electrical contact 412. Top housing 202 further comprises a cylindrical sidewall 404 having a cylindrical inner edge 406 upon which is disposed a first (or female) thread 408 that facilitates a threaded connection with bottom housing 204.

Figure 4B:
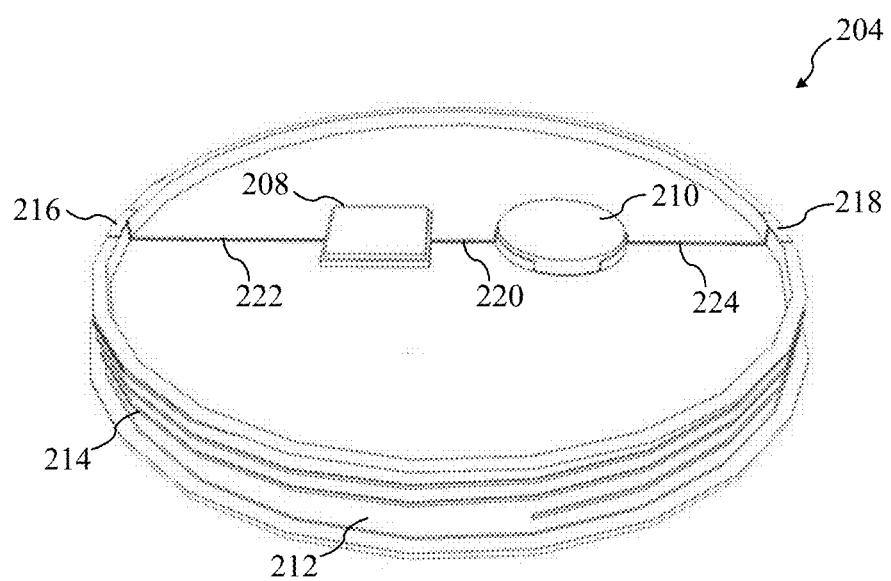
FIG. 4B is a top perspective view of the bottom housing of the timer disc of FIG. 1.

As shown in FIGS. 2 and 4B, bottom housing 204 comprises a cylindrical outer edge 212 upon which is disposed a second (or male) thread 214. By placing top housing 202 on top of bottom housing 204 and rotating top housing 202 relative to bottom housing 204, first thread 408 may be caused to engage with second thread 214 in a well-known manner, thereby enabling top housing 202 to be rotationally connected to bottom housing 204.

Sufficient rotation of top housing 202 onto bottom housing 204 via the threaded connection therebetween will cause electrical contact 410 of top housing 202 to come into contact with electrical contact 216 of bottom housing 204 at substantially the same time that electrical contact 412 of top housing 202 comes into contact with electrical contact 218 of bottom housing 204. This will complete a circuit that includes battery 210, conductive element 220, microcontroller 208, conductive element 222, electrical contact 216, electrical contact 410, conductive element 414, display 222, conductive element 416, electrical contact 412, electrical contact 218 and conductive element 224. The completion of this circuit will cause microcontroller 208 and display 122 to be activated and the timer function thereof initiated.

In an embodiment, such circuit completion will occur when top housing 202 is turned clockwise (e.g., approximately 180 degrees clockwise) onto bottom housing 204 via the threaded connection between those elements. In this way, top housing 202 may be used as a switch to enable activation of timer disc 106. Furthermore, when top housing 202 is rotated onto bottom housing 204 to this extent, the two housing components apply pressure to elastic ring 206, causing it to jut outward, thereby holding timer disc 106 in place on lid 104.

In one embodiment, an approximate 180 degree clockwise rotation is sufficient to close the circuit and activate the electronic components of timer disc 106. However, persons skilled in the relevant art(s) will readily appreciate that in different implementations a different degree of rotation may be used. Still further, counterclockwise rotation rather than clockwise rotation may be used.

Figure 5A:
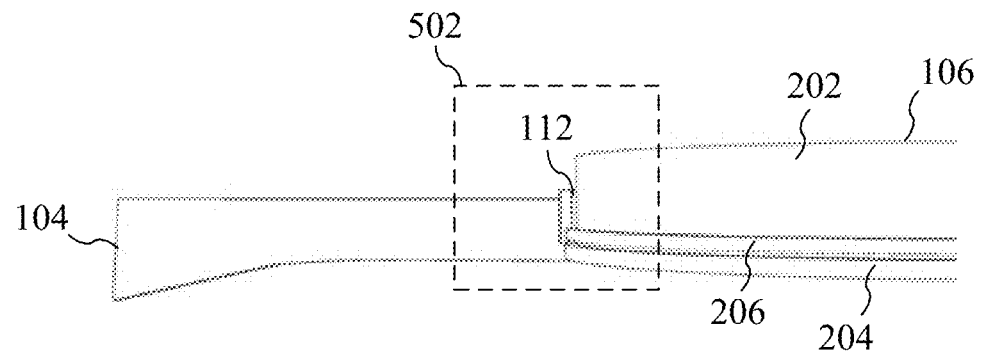
FIGS. 5A and 5B are partial views of the timer disc and the lid of FIG. 1 that illustrate how these components attach to each other.

FIG. 5A is a partial view of timer disc 106 and lid 104 that illustrate how these components attach to each other. In particular, FIG. 5A shows timer disc 106 attached to lid 104. Lid 104 is shown in cross-section so that it can be observed that, when squeezed, elastic ring 206 extends outward and applies pressure to the sides of circular recess 112 within lid 104, thereby holding timer disc 106 securely to lid 104.

Figure 5B:
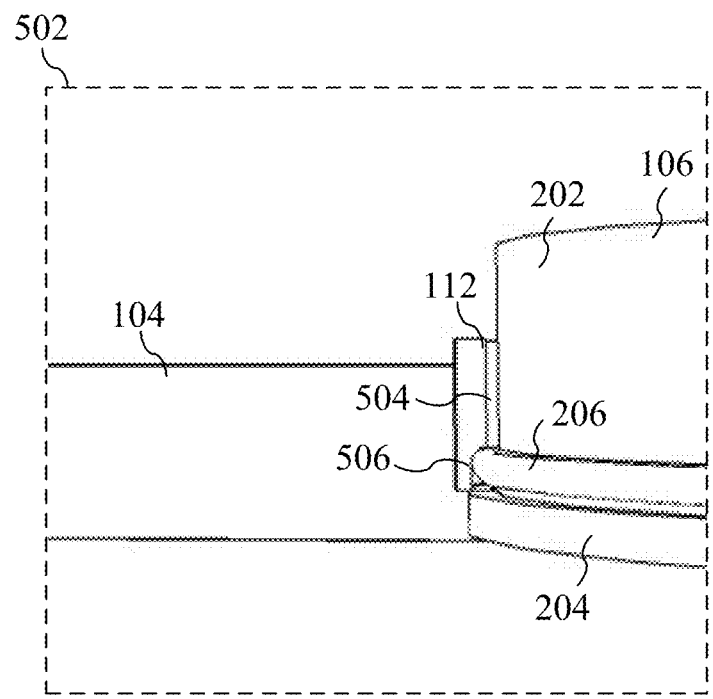

A portion 502 of FIG. 5A is shown in close-up in FIG. 5B. The close-up view shows that while timer disc 106 is attached to lid 104, after top housing is rotated clockwise approximately 180 degrees, it will compress elastic ring 206, causing it to bulge outward, thereby adhering timer disc 106 to lid 104. In particular, as shown in this embodiment, a sidewall 504 of circular recess 112 within lid 104 includes a channel 506 into which elastic ring 206 extends, thereby locking timer disc 106 to lid 104. Again, in different implementations, a different amount of rotation and/or a different direction of rotation may be used to accomplish this.

Figure 6A:
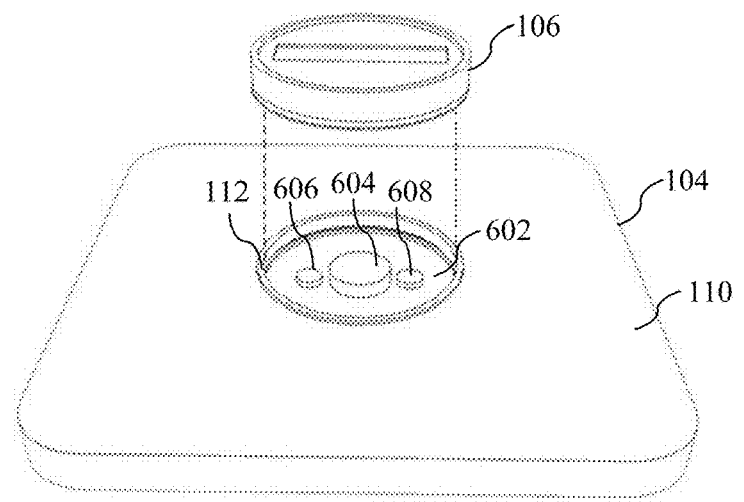
FIGS. 6A, 6B and 6C are top perspective views of the timer disc and the lid of FIG. 1 that illustrate how these components attach to each other.
Figure 6B:
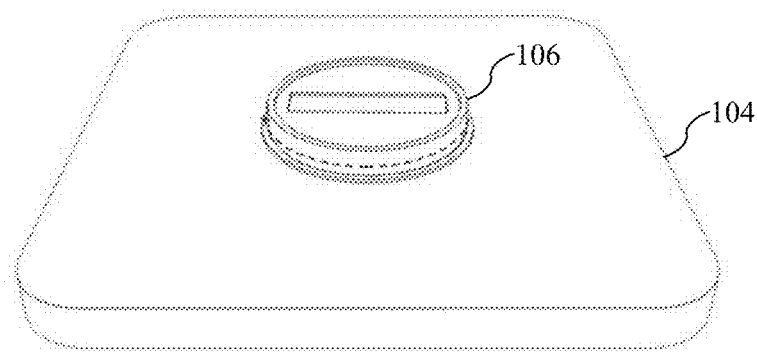
Figure 6C:
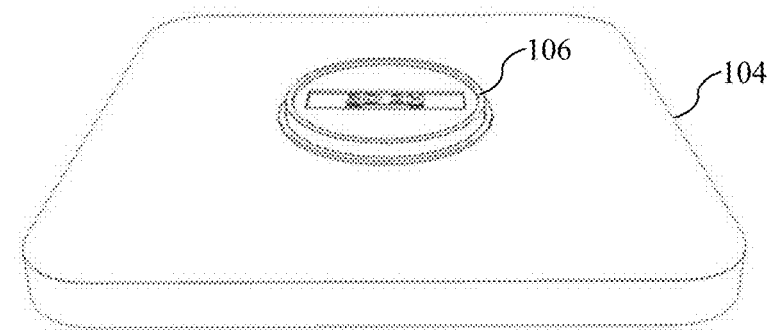

FIGS. 6A, 6B and 6C are top perspective views of timer disc 106 and lid 104 that illustrate how timer disc 106 is attached to lid 104. In particular, as shown in FIG. 6A, circular recess 112 in top surface 110 of lid 104 comprises a bottom 602 upon which is formed and from which protrudes/extends a place holder 604, a lid connector 606, and a lid connector 608. In the presently-described embodiment, each of place holder 604, lid connector 606 and lid connector 608 comprises a cylindrical protuberance or knob. As discussed above in reference to FIG. 3D, bottom surface 302 of bottom housing 204 of timer disc 106 includes three complementary recesses that are adapted to accept place holder 604, lid connector 606 and lid connector 608, respectively—namely, inverted place holder 304, bottom housing connector 306, and bottom housing connector 308. Due to the presence of these features, timer disc 106 can only be fully inserted into circular recess 112 when lid connector 606 and lid connector 608 are properly aligned with and inserted into bottom housing connector 306 and bottom housing connector 308, respectively. FIG. 6A shows the properly aligned insertion of the deactivated timer disc 106 into circular recess 112.

Once properly-aligned timer disc 106 is fully inserted into circular recess 104, timer disc 106 will be interlocked with lid 104 due to the engagement of the aforementioned knobs (which are also collectively referred to herein as a key) and recesses. This enables a user to rotate top housing 202 of timer disc 106 with respect to both bottom housing 204 and lid 104 to which it is attached. In FIG. 6B, the deactivated timer disc 106 is shown being rotated clockwise 180 degrees on the key to attach timer disc 106 to lid 104 and also to electronically activate timer disc 106. As was discussed above, the threaded rotation of top housing 202 of timer disc 106 onto bottom housing 204 when timer disc 106 is fully inserted into lid 104 will cause timer disc 106 to become securely attached to lid 104 and also cause timer disc 106 to become activated.

In FIG. 6C, the electronically activated and attached timer disc 106 is shown. Reversing the turning of timer disc 106 (i.e., by rotating it counterclockwise) by 180 degrees (or some amount up to 180 degrees depending upon the implementation) will cause elastic ring 206 to retract and timer disc 106 to become disengaged from lid 104 and will also cause the electronic components of timer 106 to deactivate due to the decoupling of the electrical contacts in top housing 202 and bottom housing 204. Furthermore, reversing the turning of timer disc 106 by further than 180 degrees will serve to remove top housing 202 from bottom housing 204, so that battery 210 can be replaced when needed. As noted above, in different embodiments, different degrees and/or directions of rotation may be used to achieve the desired functional effects.

It is to be understood that other methods or mechanisms may be used to attach timer disc 106 to lid 104 of storage container 100 as well as to also activate timer disc 106 in accordance with various embodiments.

Figure 7:
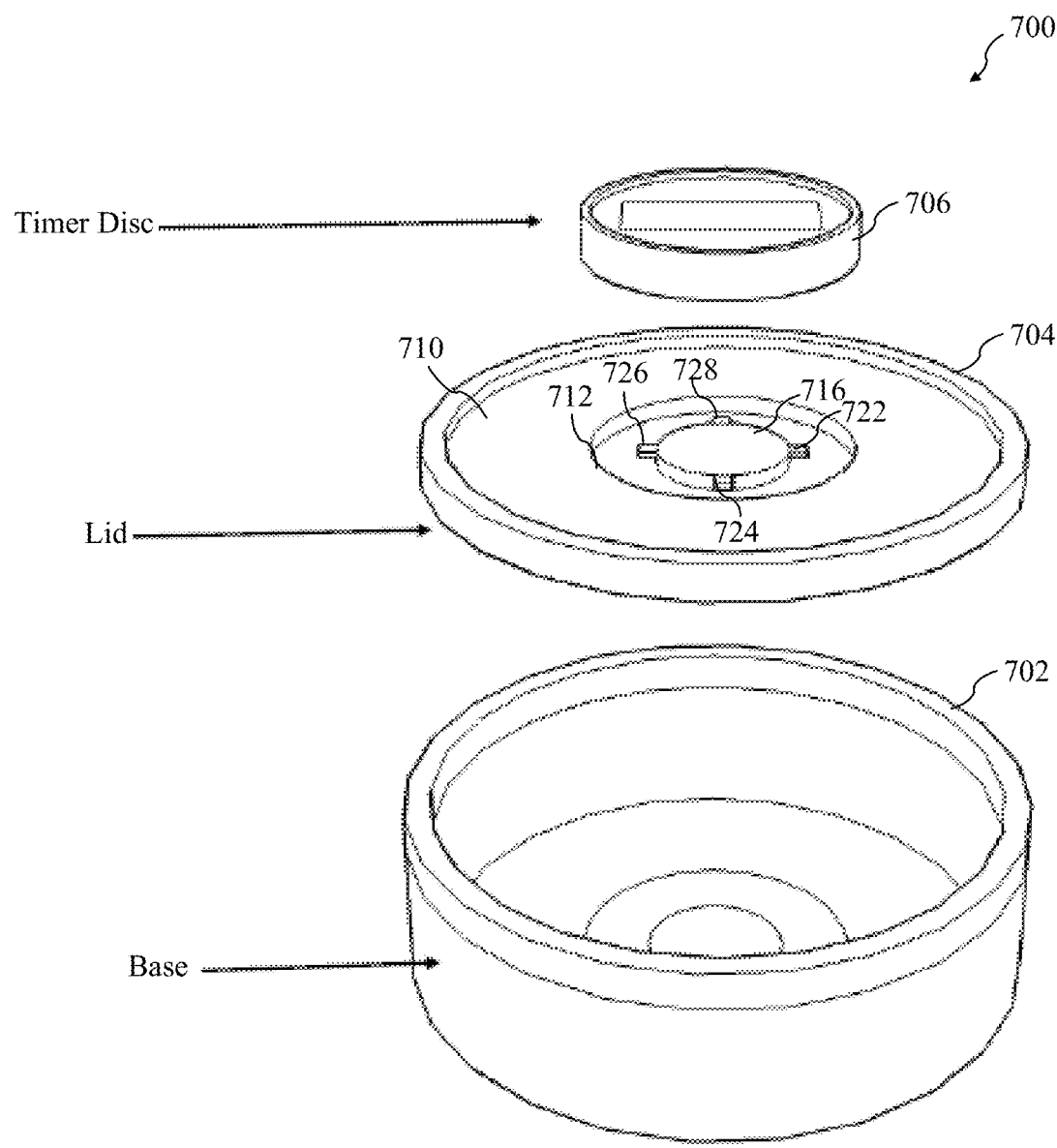
FIG. 7 is a top perspective view of a storage container that includes a base, a lid, and a timer disc that attaches to the lid, in accordance with another embodiment.

For example, FIG. 7 is a top perspective view of a storage container 700 that includes a base 702, a lid 704, and a timer disc 706 that can be removably attached to lid 704, in accordance with an embodiment that uses a sliding mechanism to connect timer disc 706 to lid 704. As shown in FIG. 7, lid 704 includes a top surface 710 in which is formed a circular recess 712. A cylindrical stand 716 is formed on the center of circular recess 712 and four teeth 722, 724, 726 and 728 extend therefrom.

Figure 8:
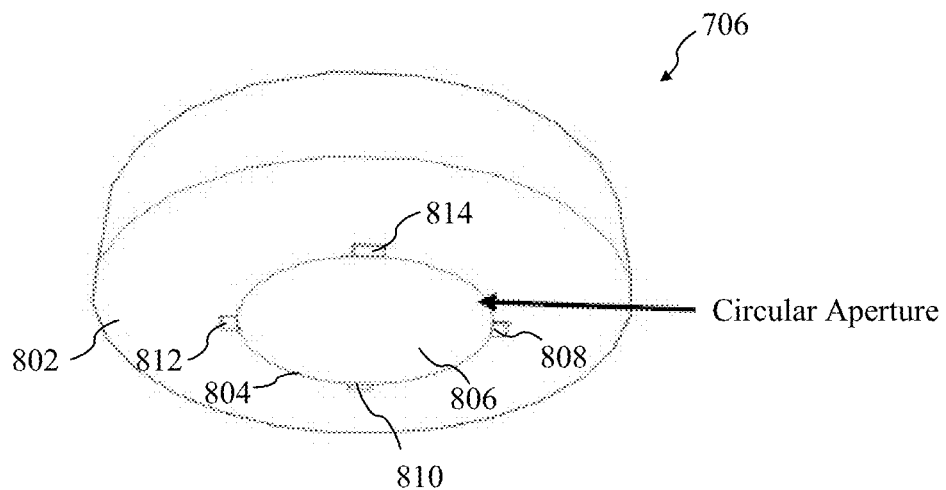
FIG. 8 is a bottom perspective view of the timer disc of FIG. 7, with a button thereof in an inactivated state.

FIG. 8 is a bottom perspective view of timer disc 706. As shown in FIG. 8, timer disc 706 comprises a bottom surface 802 having a circular aperture 804 formed therein and within which a button 806 is disposed. Activation of button 806 turns on electronic components of timer disc 706 (e.g., by completing a circuit that interconnects an internal battery of timer disc 706 with a microcontroller and display thereof). In FIG. 8, button 806 is shown in an inactivated state.

As further shown in FIG. 8, four grooves 808, 810, 812 and 814 are formed on an internal edge of circular aperture 804. Each of teeth 722, 724, 726 and 728 on lid 104 can be inserted into a corresponding one of grooves 808, 810, 812 and 814 and then slidably rotated to lock timer disc 706 to lid 704.

Figure 9:
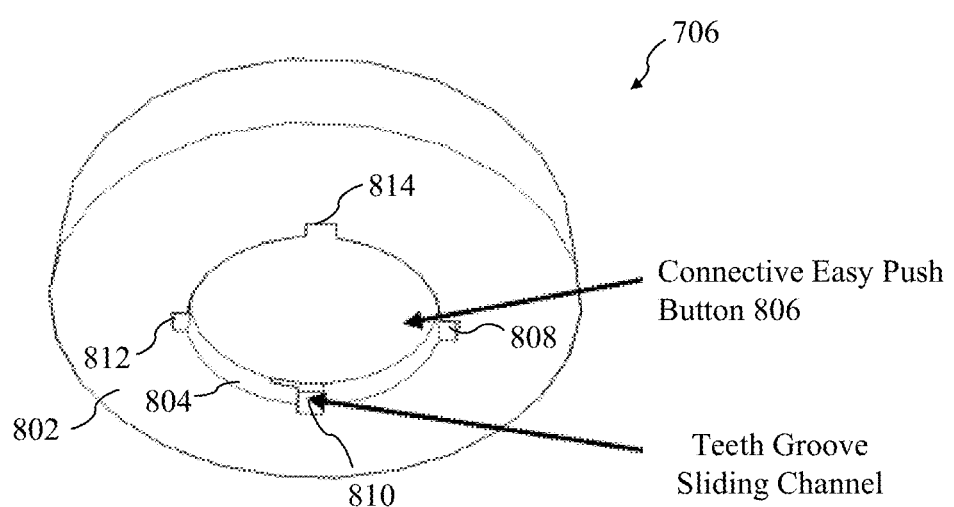
FIG. 9 is a bottom perspective view of the timer disc of FIG. 7, with a button thereof in an activated state.

This locking of timer disc 706 to lid 704 will also cause button 806 to be continually pressed by cylindrical stand 716, thereby keeping button 806 in its activated state and maintaining power to the electronic components of timer disc 706. FIG. 9 is a bottom perspective view of timer disc 706 with button 806 shown in an activated state. In this view, it can be seen that groove 810 provides access to a sliding channel formed on the internal edge of circular aperture 804. It is to be understood that each of grooves 808, 812 and 814 also provides access to a corresponding different sliding channel formed on the internal edge of circular aperture 804.

Figure 10:
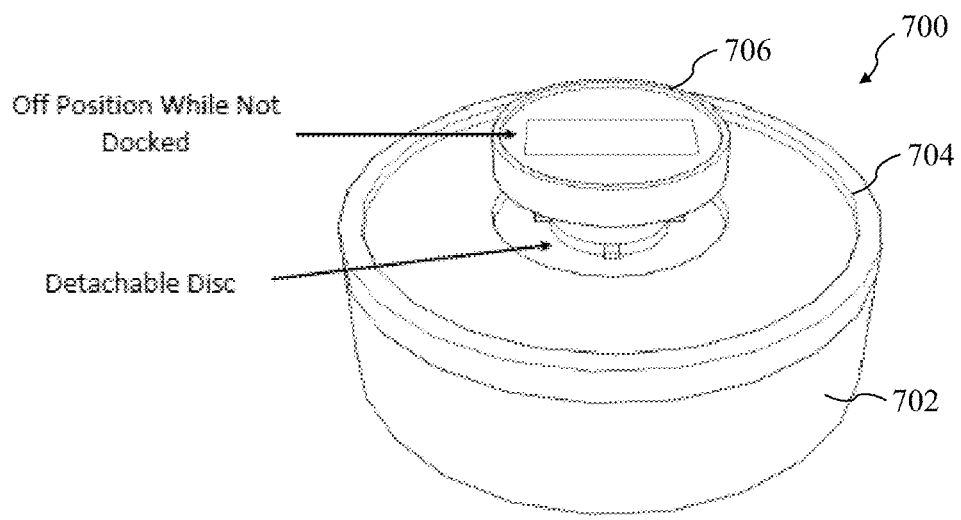
FIGS. 10 and 11 are top perspective views of the storage container of FIG. 7 that illustrate how the timer disc thereof is attached to the lid thereof.
Figure 11:
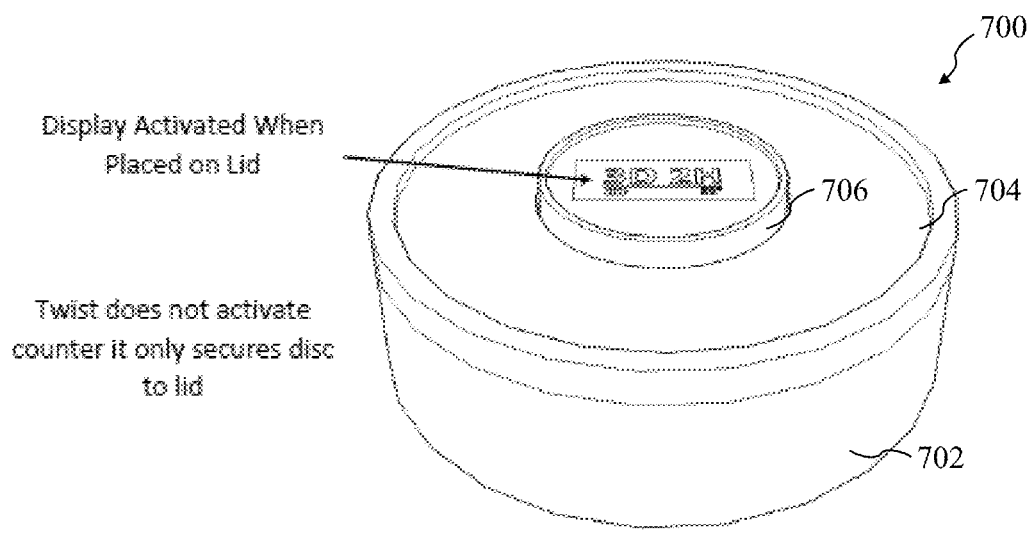

FIGS. 10 and 11 are top perspective views of storage container 700 of FIG. 7 that illustrate how timer disc 706 may be removably attached to lid 704. As shown in FIG. 10, timer disc 706 is not connected to lid 704 and is thus in an inactive (powered off) state. However, by aligning grooves 808, 810, 812 and 814 of timer disc 706 with teeth 722, 724, 726 and 728 of lid 104, timer disc 706 can be lowered onto cylindrical stand 716 and then rotated to cause the teeth to slide along corresponding sliding channels of lid 104, thereby securing timer disc 706 to lid 704. The insertion of the teeth into the grooves also causes button 806 to be pressed by cylindrical stand 716 and the locking of timer disc 706 to lid 704 ensures that button 806 stays pressed. This ensures that the electronic components of timer disc 706 remained powered/active.

FIG. 11 shows timer disc 706 attached to lid 704. To disengage and power off timer disc 706, timer disc 706 need only be rotated in the opposite direction until the teeth can be extracted from the corresponding grooves, and then timer disc 706 can be removed from lid 704.

As another example, FIGS. 12-16 depict a storage container comprising a base, a lid and a timer disc that can be removably attached to the lid in accordance with an alternative embodiment that uses a snug-fit or "pop" mechanism to connect the timer disc to the lid.

Figure 12:
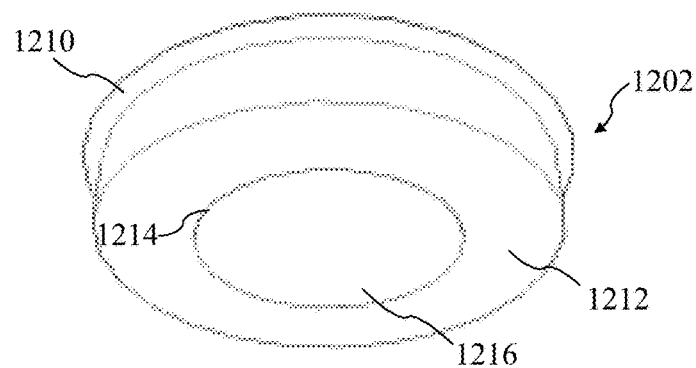
FIG. 12 is a bottom perspective view of a timer disc of a storage container in accordance with another embodiment, with a button thereof in an inactivated state.

FIG. 12 is a bottom perspective view of a timer disc 1202 in accordance with such an embodiment. As shown in FIG. 12, timer disc 1202 comprises a bottom surface 1212 having a circular aperture 1214 formed therein and within which a button 1216 is disposed. Activation of button 1216 turns on electronic components of timer disc 1202 (e.g., by completing a circuit that interconnects an internal battery of timer disc 1202 with a microcontroller and display thereof). In FIG. 12, button 1216 is shown in an inactivated state. FIG. 12 also shows that timer disc 1202 includes a lip 1210 that enables a user to grip timer disc 1202 when it is secured to a lid.

Figure 13:
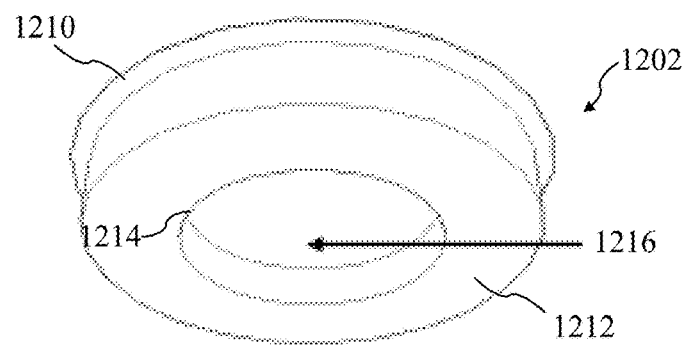
FIG. 13 is a bottom perspective view of the timer disc of FIG. 12, with the button thereof in an activated state.

FIG. 13 is a bottom perspective view of timer disc 1202 with button 1216 in an activated state.

Figure 14:
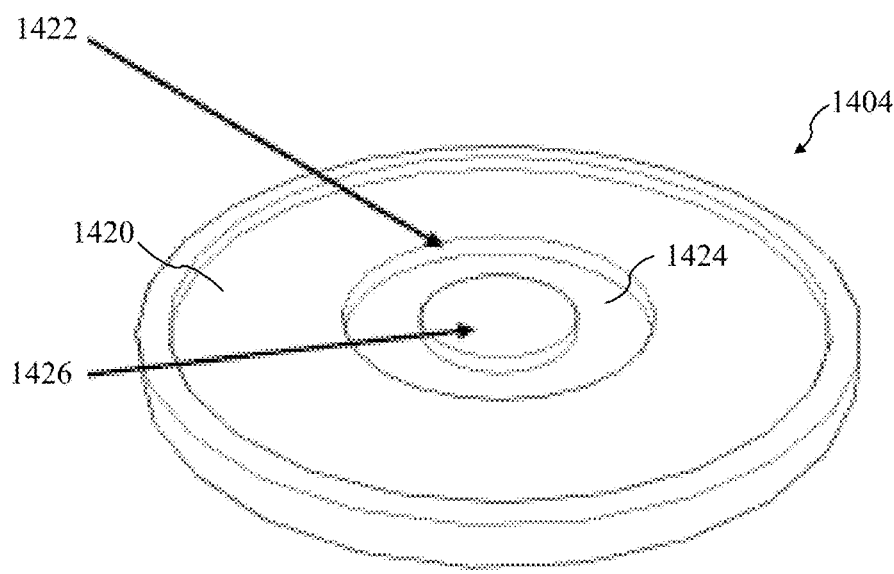
FIG. 14 is a top perspective view of a lid to which the timer disc of FIG. 12 attaches.

FIG. 14 is a top perspective view of a lid 1404 to which timer disc 1202 attaches. As shown in FIG. 14, lid 1404 includes a top surface 1420 in which is formed a circular recess 1422. A cylindrical stand 1426 is formed on the center of circular recess 1422. Circular recess 1422 and cylindrical stand 1426 are sized to form a snug fit with corresponding components of timer disc 1202.

Figure 15:
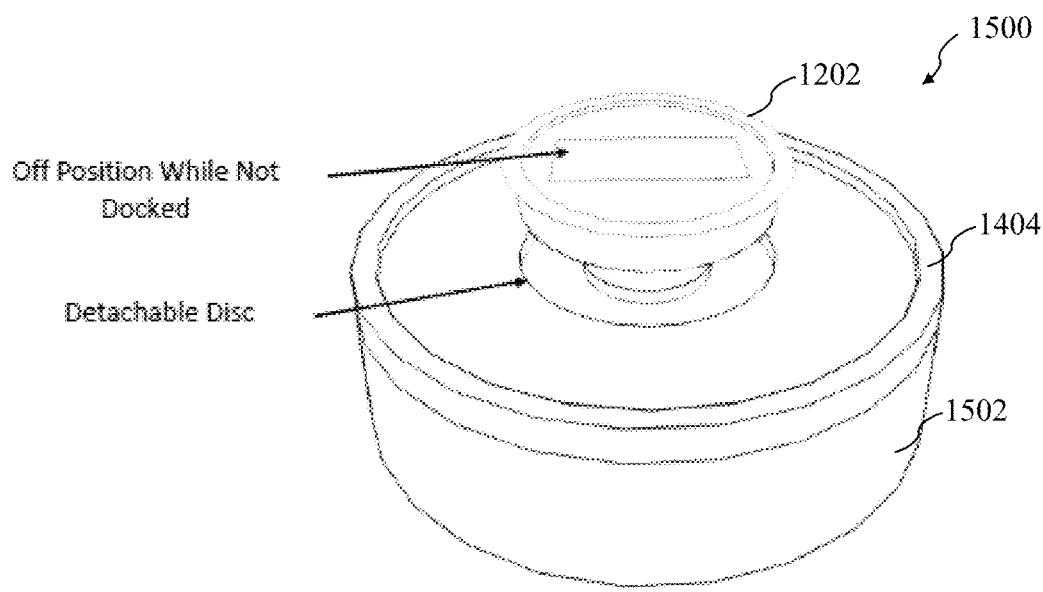
FIGS. 15 and 16 are top perspective views of a storage container that includes a base, the timer disc of FIG. 12 and the lid of FIG. 14, that show how the timer disc is attached to the lid.
Figure 16:
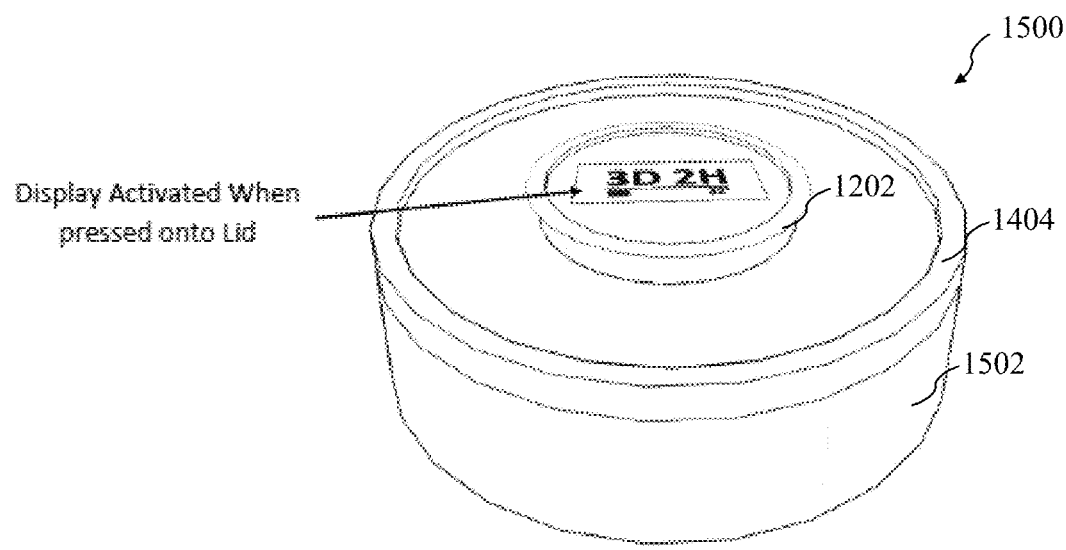

FIGS. 15 and 16 are top perspective views of a storage container 1500 that includes a base 1502, timer disc 1202 and lid 1404, that show how timer disc 1202 may be removably attached to lid 1404. As shown in FIG. 15, timer disc 1202 is not connected to lid 1404 and is thus in an inactive (powered off) state. However, by aligning circular aperture 1214 of timer disc 1202 with cylindrical stand 1426 of lid 1404, timer disc 1202 can be lowered onto cylindrical stand 1426, thereby causing the bottom of timer disc 1202 to make a snug fit with circular recess 1422 of lid 1404. This secures timer disc 1202 to lid 1404. This also causes button 1216 to be continuously pressed by cylindrical stand 1426, thereby ensuring that the electronic components of timer disc 1202 remained powered/active.

FIG. 16 shows timer disc 1202 attached to lid 1404. To disengage and power off timer disc 1202, timer disc 1202 need only be pulled from lid 1404 with sufficient force that the seal therebetween is broken. A user may pull up on lip 1210 of timer disc 1202 to help break the seal.

As yet another example, FIGS. 17-21 depict a storage container comprising a base, a lid and a timer disc that can be removably attached to the lid in accordance with an alternative embodiment that uses a magnet to connect the timer disc to the lid.

Figure 17:
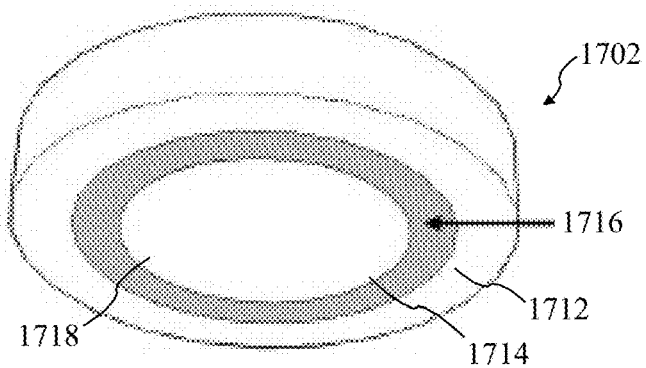
FIG. 17 is a bottom perspective view of a timer disc of a storage container in accordance with another embodiment, with a button thereof in an inactivated state.

FIG. 17 is a bottom perspective view of a timer disc 1702 in accordance with such an embodiment. As shown in FIG. 17, timer disc 1702 comprises a bottom surface 1712 having a circular aperture 1714 formed therein and within which a button 1718 is disposed. Activation of button 1718 turns on electronic components of timer disc 1702 (e.g., by completing a circuit that interconnects an internal battery of timer disc 1702 with a microcontroller and display thereof). In FIG. 17, button 1718 is shown in an inactivated state. FIG. 17 also shows that timer disc 1702 includes a ring magnet 1716 that surrounds circular aperture 1714.

Figure 18:
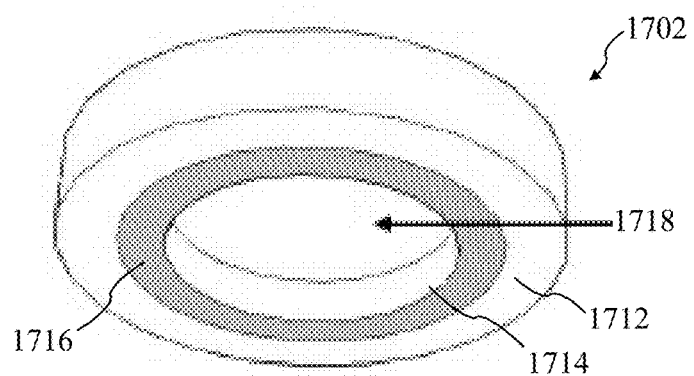
FIG. 18 is a bottom perspective view of the timer disc of FIG. 17, with the button thereof in an activated state.

FIG. 18 is a bottom perspective view of timer disc 1702 with button 1718 in an activated state.

Figure 19:
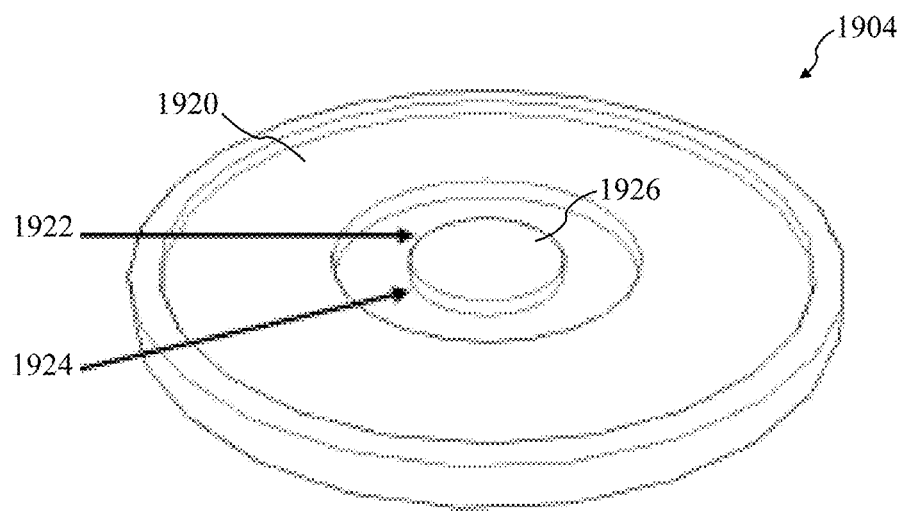
FIG. 19 is a top perspective view of a lid to which the timer disc of FIG. 17 attaches.

FIG. 19 is a top perspective view of a lid 1904 to which timer disc 1702 attaches. As shown in FIG. 19, lid 1904 includes a top surface 1920 in which is formed a circular recess 1922. A cylindrical stand 1926 is formed on the center of circular recess 1922. A metal inset 1924 is disposed within circular recess 1922 around cylindrical stand 1926. Circular recess 1922 and cylindrical stand 1926 may also be sized to form a snug fit with corresponding components of timer disc 1702.

Figure 20:
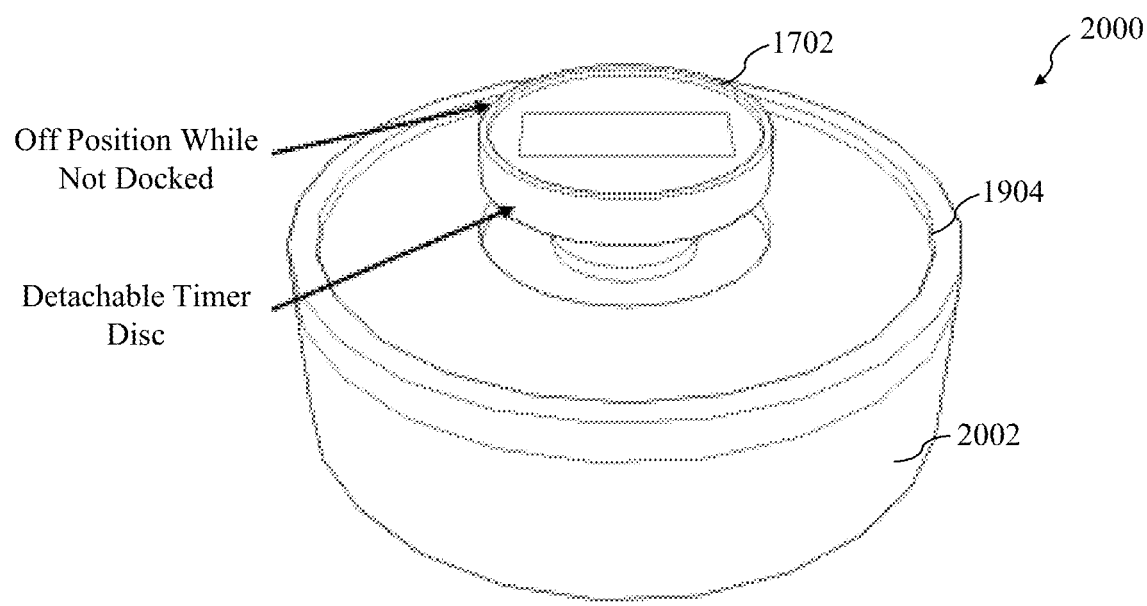
FIGS. 20 and 21 are top perspective views of a storage container that includes a base, the timer disc of FIG. 17 and the lid of FIG. 19, that show how the timer disc is attached to the lid.
Figure 21:
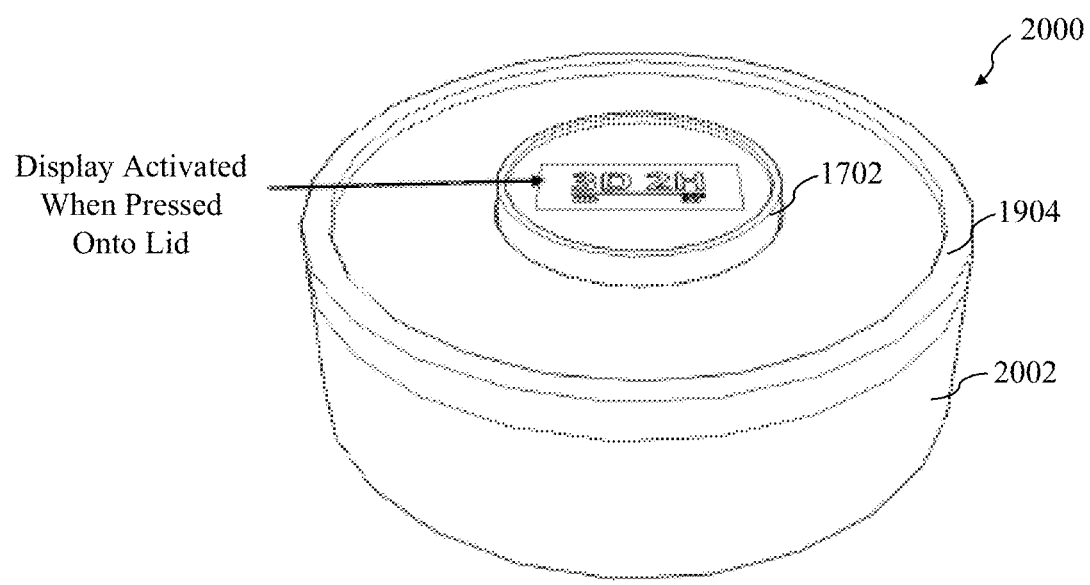

FIGS. 20 and 21 are top perspective views of a storage container 2000 that includes a base 2002, timer disc 1702 and lid 1904, that show how timer disc 1702 may be removably attached to lid 1904. As shown in FIG. 20, timer disc 1702 is not connected to lid 1904 and is thus in an inactive (powered off) state. However, by aligning circular aperture 1714 of timer disc 1702 with cylindrical stand 1926 of lid 1904, timer disc 1702 can be lowered onto cylindrical stand 1926, thereby causing a magnetic connection to be formed between ring magnet 1716 and metal inset 1924 and thus securely attaching timer disc 1702 to lid 1904. The bottom of timer disc 1702 may also make a snug fit with circular recess 1922 of lid 1904, thereby strengthening the attachment. The foregoing attachment also causes button 1718 to be continuously pressed by cylindrical stand 1926, thereby ensuring that the electronic components of timer disc 1702 remained powered/active.

FIG. 21 shows timer disc 1702 attached to lid 1904. To disengage and power off timer disc 1702, timer disc 1702 need only be pulled from lid 1904 with sufficient force that the attachment therebetween is broken.

As yet another example, FIGS. 22-26 depict a storage container comprising a base, a lid and a timer disc that can be removably attached to the lid in accordance with an alternative embodiment that uses a twisting mechanism to connect the timer disc to the lid.

Figure 22:
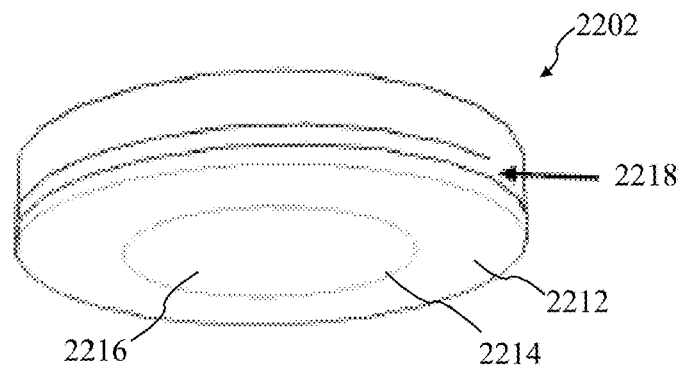
FIG. 22 is a bottom perspective view of a timer disc of a storage container in accordance with another embodiment, with a button thereof in an inactivated state.

FIG. 22 is a bottom perspective view of a timer disc 2202 in accordance with such an embodiment. As shown in FIG. 22, timer disc 2202 comprises a bottom surface 2212 having a circular aperture 2214 formed therein and within which a button 2216 is disposed. Activation of button 2216 turns on electronic components of timer disc 2202 (e.g., by completing a circuit that interconnects an internal battery of timer disc 2202 with a microcontroller and display thereof). In FIG. 22, button 2216 is shown in an inactivated state. FIG. 17 also shows that timer disc 1702 includes a first (male) thread 2218 disposed around an external edge of timer disc 2202.

Figure 23:
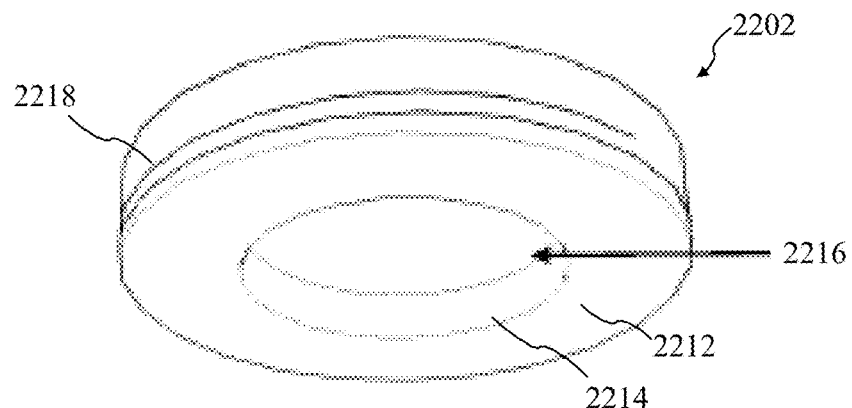
FIG. 23 is a bottom perspective view of the timer disc of FIG. 22, with the button thereof in an activated state.

FIG. 23 is a bottom perspective view of timer disc 2202 with button 2216 in an activated state.

Figure 24:
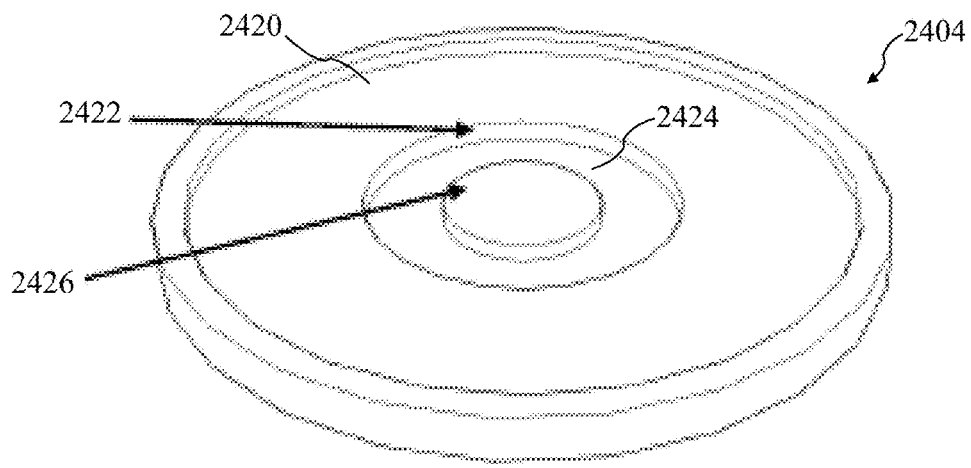
FIG. 24 is a top perspective view of a lid to which the timer disc of FIG. 22 attaches.

FIG. 24 is a top perspective view of a lid 2404 to which timer disc 2202 attaches. As shown in FIG. 24, lid 2404 includes a top surface 2420 in which is formed a circular recess 2424. A cylindrical stand 2426 is formed on the center of circular recess 2424. A second (female) thread 2422 is disposed around an internal edge of circular recess 2424.

Figure 25:
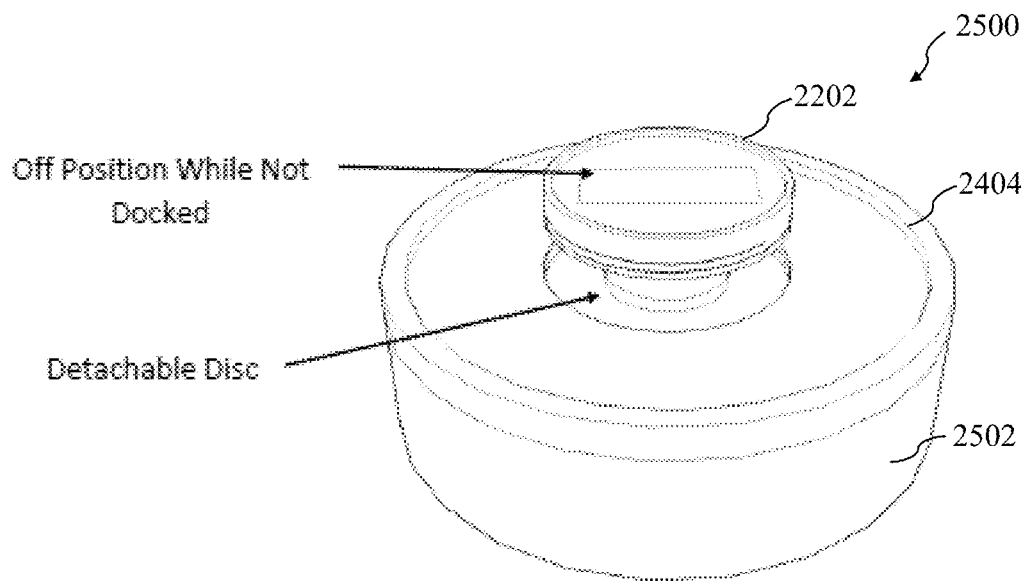
FIGS. 25 and 26 are top perspective views of a storage container that includes a base, the timer disc of FIG. 22 and the lid of FIG. 24, that show how the timer disc is attached to the lid.
Figure 26:
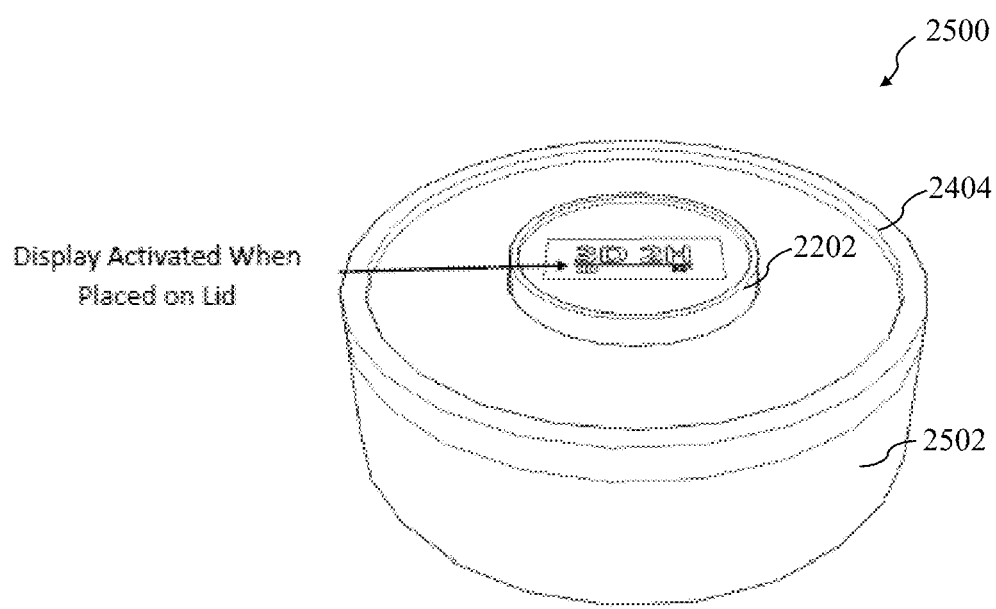

FIGS. 25 and 26 are top perspective views of a storage container 2500 that includes a base 2502, timer disc 2202 and lid 2404, that show how timer disc 2202 may be removably attached to lid 2404. As shown in FIG. 25, timer disc 2202 is not connected to lid 2404 and is thus in an inactive (powered off) state. However, by aligning circular aperture 2214 of timer disc 2202 with cylindrical stand 2426 of lid 2404, and aligning first thread 2218 with second thread 2422, timer disc 2202 can be rotated onto cylindrical stand 2426 and into circular recess 2424, thereby securely attaching timer disc 2202 to lid 2404. The foregoing method of attachment also causes button 2216 to be continuously pressed by cylindrical stand 2426, thereby ensuring that the electronic components of timer disc 2202 remained powered/active.

FIG. 26 shows timer disc 2202 attached to lid 2404. To disengage and power off timer disc 2202, timer disc 2202 need only be rotated off of lid 1404.

In embodiments, the timer disc may include a wireless interface that enables information to be transmitted to or from the timer disc. For example, the microcontroller within the timer disc may utilize the wireless interface to send notifications or other types of messages to a smart refrigerator, a smart phone, a virtual assistant (e.g., Amazon Alexa), or the like, or to applications executing on such devices. In embodiments, information that may be relayed from the timer disc to other devices may include an elapsed time since activation of the timer disc, information concerning the contents of the storage container to which the timer disc is attached, information concerning the status of the battery (e.g., charge state) within the timer disc, or the like. The microcontroller within the timer disc may also utilize the wireless interface to receive commands or other information from external devices and/or applications executing on such external devices. The wireless interface may comprise, for example and without limitation, a Bluetooth interface, a WiFi (IEEE 802.11) interface, a Telecom network interface, or the like.

Figure 27:
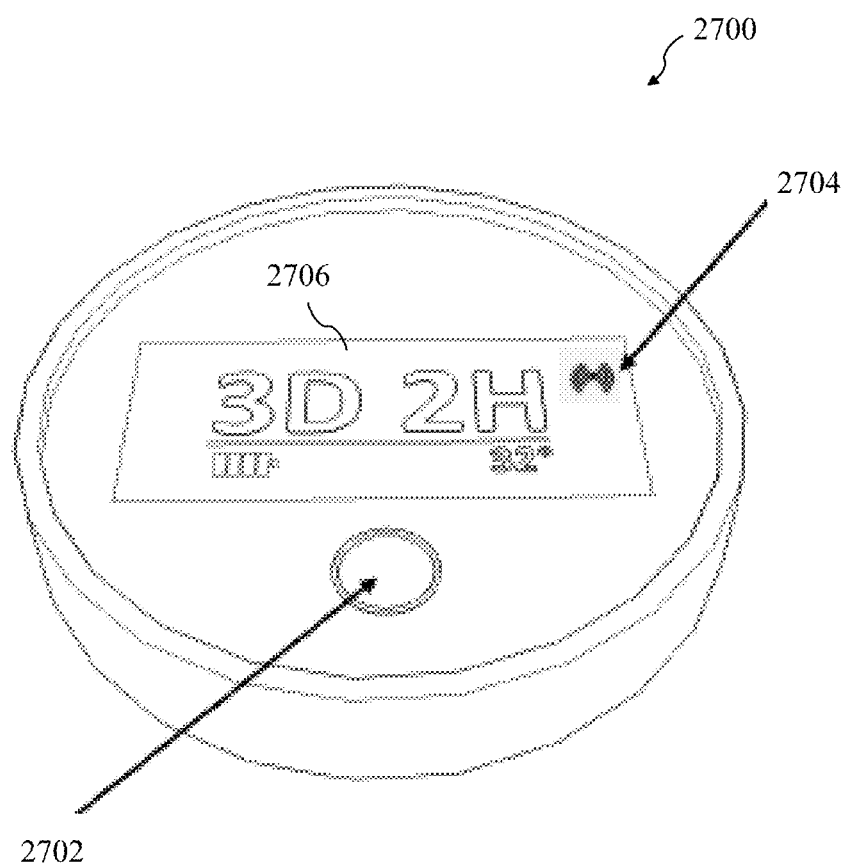
FIG. 27 is a top perspective view of a timer disc that attaches to a lid of a storage container in accordance with a further embodiment.

In this regard, FIG. 27 is a top perspective view of a timer disc 2700 of a storage container that supports Bluetooth communication with at least one Bluetooth-capable external device in accordance with an embodiment. As shown in FIG. 20, timer disc 2700 may include a Bluetooth button 2702 that a user may press to initiate a Bluetooth pairing between timer disc 2700 and the Bluetooth-capable external device. As further shown in FIG. 27, a display 2706 of timer disc 2700 may display a Bluetooth indicator 2704 that indicates a status of such Bluetooth connection.

The timer disc may also use RFID technology to communicate with an external device, or display barcodes or QR codes that can be read by an application running on an external device to obtain information from the timer disc.

Figure 28:
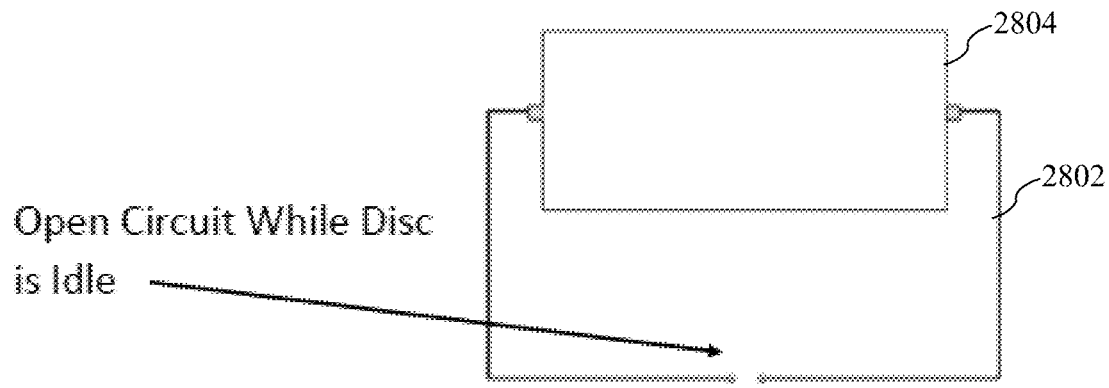
FIGS. 28 and 29 illustrate circuit elements of a storage container in accordance with embodiments.
Figure 29:
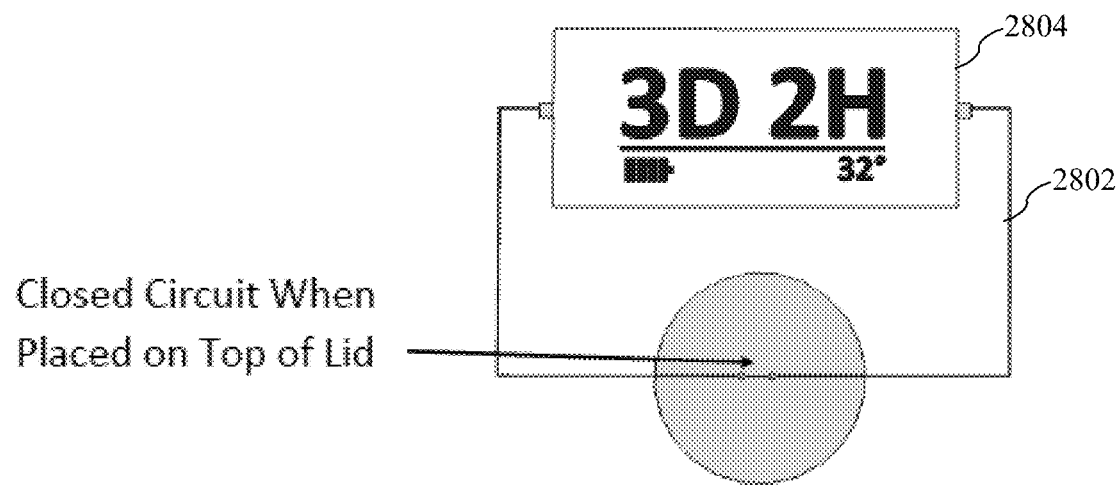

FIGS. 28 and 29 illustrate circuit elements of a timer disc of a storage container in accordance with embodiments. As shown in FIG. 28, the timer disc includes a circuit 2802 that includes a display 2804. Circuit 2802 is open when the timer disc is disconnected from a lid of the storage container. However, as shown in FIG. 29, when the timer disc is connected to the lid of the storage container, circuit 2802 is closed, thereby electronically activating display 2804 (as well as the microcontroller). This advantageously conserves the life of the timer disc battery when the timer disc is not in use and also automatically starts the elapsed time tracking function of the timer when the disc is inserted into the lid for connection purposes. There also may be a light sensor included on the timer disc to switch off functions of the display (but not resetting or fully deactivating the display) when it is dark and to activate such functions when it is light, thereby further conserving battery life and the life of the display. A small solar panel may also be used to limit the timeframe for the display to be switched on during the moments of exposure to light. Still further, the display screen may be turned off when a temperature sensor included in the timer disc reaches a predetermined temperature. For example, assuming that the standard internal temperature of a refrigerator is 35° F., the timer disc may be configured to turn off the screen display function (without resetting the display or fully deactivating it) when an internal temperature sensor recognizes that the temperature has dropped to 35° F.

Note that in any of the foregoing embodiments, the timer disc may include a magnet (e.g., in the bottom housing thereof) that enables the timer disc to be conveniently attached to a refrigerator door or other metal surface when such timer disc is not connected to a lid of a storage container. Furthermore, in some embodiments, the timer disc is constructed in a manner that renders it water-proof or water-resistant. Also, in some embodiments, the timer disc may comprise a speaker that enables the timer disc to generate audible alerts, for example, when the amount of elapsed time passes a predetermined threshold.

Figure 30:
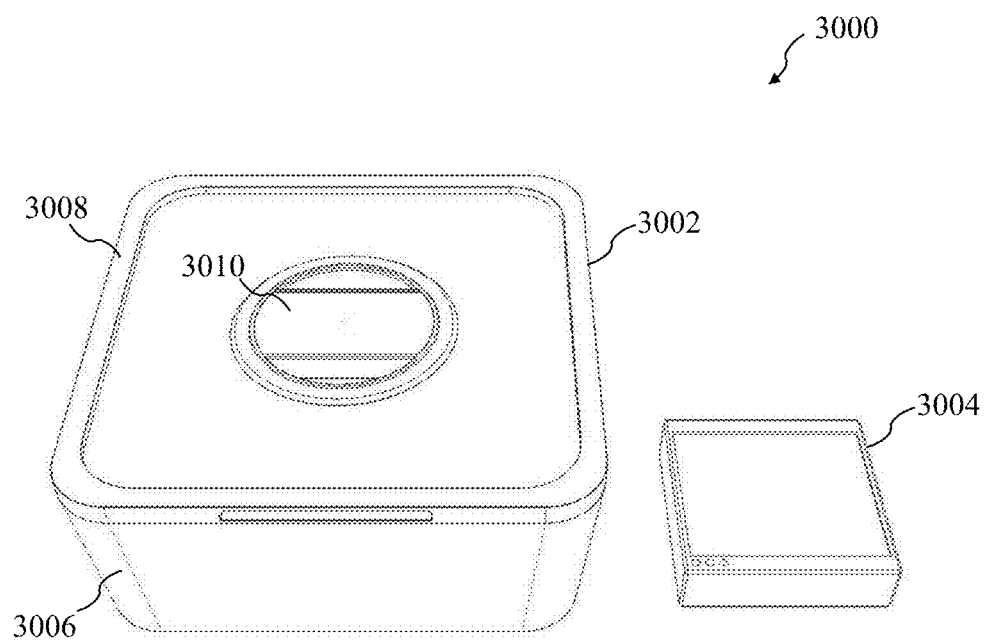
FIG. 30 is a top perspective view of a system that comprises a storage container with attachable timer disc and a bridge device, wherein the timer disc and the bridge device may be communicatively connected to each other, in accordance with an embodiment.

FIG. 30 is a top perspective view of a system 3000 that comprises a storage container 3002 and a bridge device 3004. Storage container 3002 comprises a base 3006, a lid 3008 and a timer disc 3010 that can be removably attached to lid 3008. Storage container 3002 may be representative of any of the various storage containers described herein. Each of timer disc 3010 and bridge device 3004 include a respective wireless interface that enables it to communicate with the other device. For example, each of timer disc 3010 and bridge device 3004 may include a Bluetooth radio that enables the devices to communicate with each other via a Bluetooth connection. Furthermore, bridge device 3004 may include one or more other wired and/or wireless interfaces that enables it to communicate with devices other than timer disc 3010 via other connections (e.g., peer-to-peer or network connections). For example, bridge device 3004 may include a WiFi (IEEE 802.11) or Ethernet interface that enables bridge device 3004 to communicate with a router/modem. In this way, bridge device 3004 can pass information between timer disc 3010 and other devices that bridge device 3004 is able to connect to via the router/modem.

Figure 31:
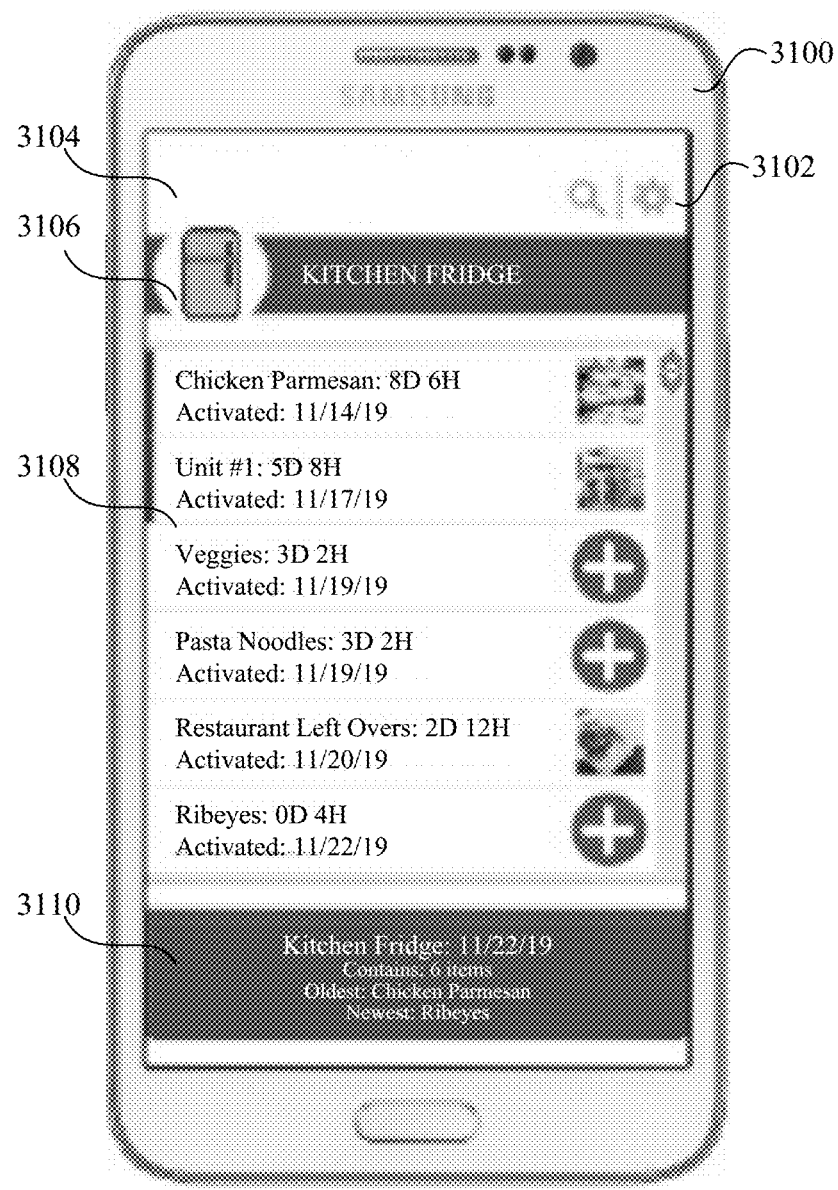
FIG. 31 is a front view of a device that can communicate with one or more timer discs and that executes an application that enables reporting of information collected from such timer discs, in accordance with an embodiment.

FIG. 31 is a front view of a device 3100 that can communicate with one or more timer discs and that executes an application that enables reporting of information collected from such timer discs, in accordance with an embodiment. For example, device 3100 may communicate with timer disc 3010 of FIG. 30 via a direct connection (e.g., via a direct Bluetooth connection to timer disc 3010) or via an indirect connection (e.g., via a network connection to a router that is connected to bridge device 3004, which is in turn connected to timer disc 3010). Still other methods of communication between device 3100 and timer disc 3010 are possible.

As shown in FIG. 31, a graphical user interface (GUI) 3104 of the application is shown within a display 3102 of device 3100. The application may provide a user with the ability to monitor and organize the contents of their designated storage repository while being away and on the move.

As further shown in FIG. 31, GUI 3104 may include a header 3106, an items list 3108, and a summary 3110. Header 3106 may display a primary location of a timer disc (e.g., kitchen refrigerator, garage refrigerator, shed, etc.). Item list 3108 may display items identified by the user in their designated storage repository. For each item in item list 3108, the application may display a name, an elapsed storage time, and a date of timer disc activation. The application may also enable a user to edit various details about each item and/or add a picture to each item. The application may also highlight items in item list 3108 that have an elapsed storage time that exceeds a predefined threshold (e.g., by showing such items in red, moving such items to the top of the list, etc.). Summary 3110 displays a general breakdown for units inside the designated storage repository.

Figure 32:
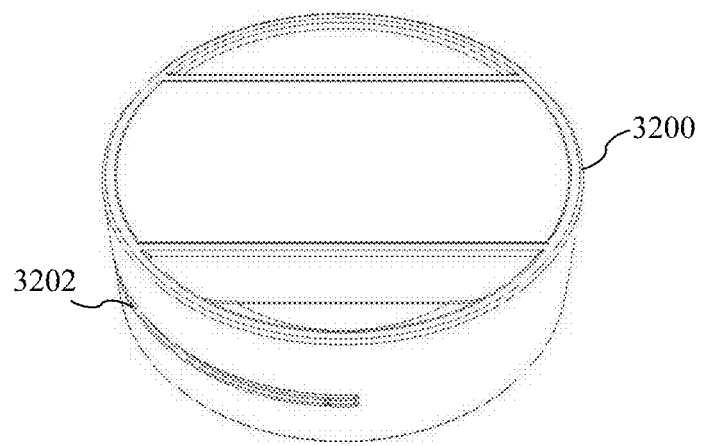
FIG. 32 is a top perspective view of a timer disc of a storage container in accordance with another embodiment.

FIG. 32 is a top perspective view of a timer disc 3200 of a storage container in accordance with another embodiment. Timer disc 3200 includes a sliding channel 3202 formed in an external edge of timer disc 3200 and accessible from the bottom of timer disc 3200 via a groove (groove not visible in FIG. 32). Timer disc 3200 is configured to connect to a lid having a tooth or knob that extends from an internal edge of a circular recess formed in a top surface of the lid. Timer disc 3200 may have a button disposed in a circular aperture on its bottom that is activated through interaction with a cylindrical stand formed in the center of the circular recess, as was seen with other designs discussed herein.

Figure 33:
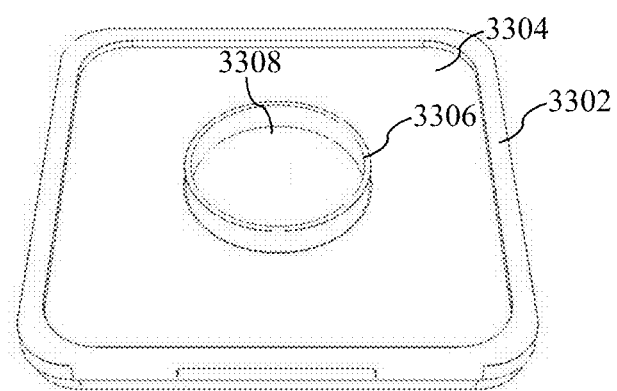
FIG. 33 is a top perspective view of a storage container lid to which a timer disc may be attached in accordance with a further embodiment.

FIG. 33 is a top perspective view of a storage container lid 3302 to which a timer disc may be removably attached in accordance with a further embodiment. Storage container lid 3302 includes a push down button 3306 that extends from a top surface 3304 of lid 3302 and that, when pressed down, activates a suction connection from lid 3302 to a container base. A recess 3308 is formed in push down button 3306.

Figure 34:
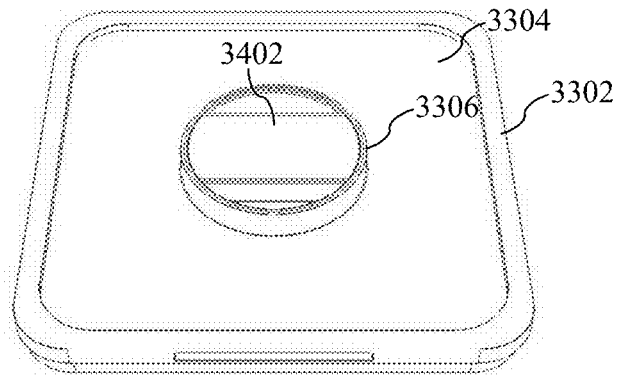
FIG. 34 is a top perspective view of the storage container lid of FIG. 33 with a timer disc attached to a pop button thereof, wherein the pop button is inactivated.

FIG. 34 is a top perspective view of the storage container lid 3302 with a timer disc 3402 inserted into recess 3308 of push down button 3306. Any of the foregoing mechanisms for connecting a timer disc to a circular recess formed in a top surface of a lid may also be applied to connect timer disc 3402 to recess 3308 in push down button 3306 and to activate timer disc 3402.

Figure 35:
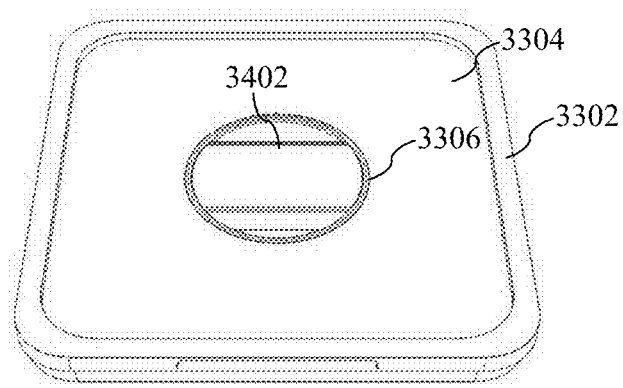
FIG. 35 is a top perspective view of the storage container lid of FIG. 33 with a timer disc attached to a pop button thereof, wherein the pop button is activated.

FIG. 35 is a top perspective view of storage container lid 3302 with a timer disc attached to push down button 3306, wherein push down button 3306 has been activated by pressing it down into top surface 3304 of lid 3302, thereby creating a suction connection from lid 3302 to the container base.

Figure 36:
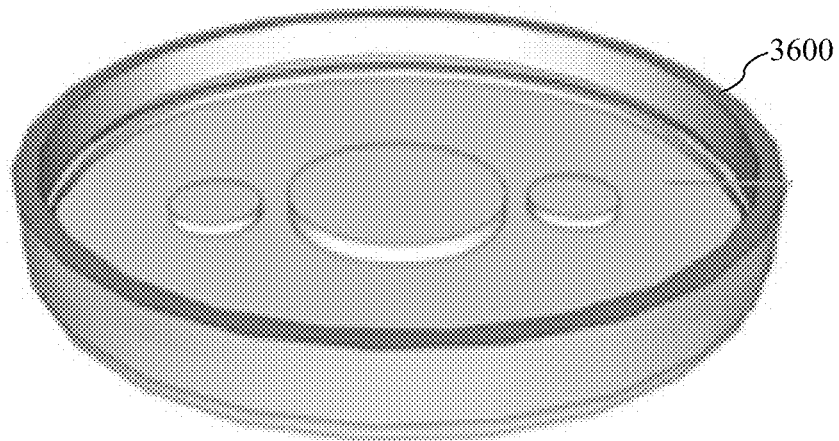
FIG. 36 is a top perspective view of a base to which a timer disc can be removably attached and that itself can be securely attached to a container, in accordance with an embodiment.

FIG. 36 is a top perspective view of a base 3600 to which a timer disc can be removably attached and that itself can be securely attached to a container, in accordance with an embodiment. As shown in FIG. 36, base 3600 comprises a circular tray that has a substantially similar shape and design to circular recess 112 of lid 104 as discussed above in reference to the embodiment of FIGS. 1, 2, 3A-3D, 4A, 4B, 5A, 5B, and 6A-6C. Thus, a timer disc such as timer disc 106 can be removably attached to base 3600 and activated through such attachment process in a like manner to that previously described. Base 3600 may be made of any suitable material including metal, plastic, glass, or the like.

Figure 37:
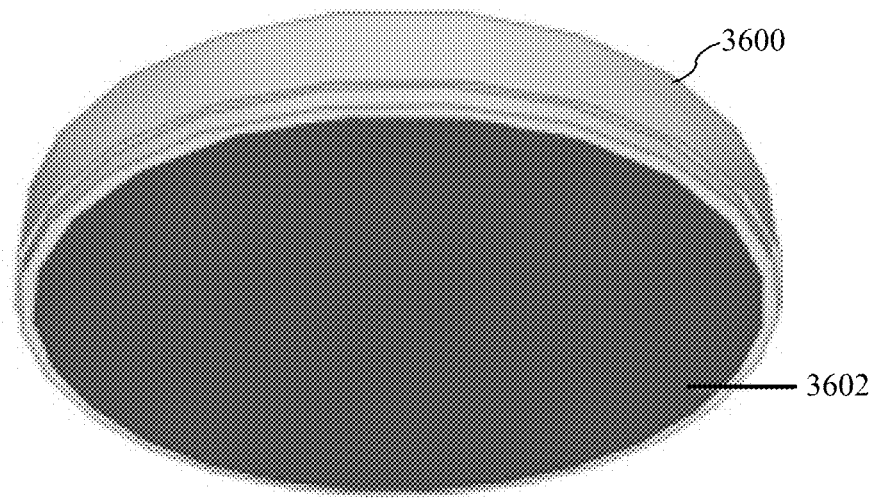
FIG. 37 is a bottom perspective view of the base of FIG. 36.

FIG. 37 is a bottom perspective view of base 3600. As shown in FIG. 37, a bottom surface of base 3600 may include a layer of industrial adhesive tape 3702 that enables base 3600 to be attached to a variety of surfaces and container types. For example, attachable base 3600 may be attached to containers typically used within the restaurant, construction, hospitality, agricultural, transportation, mining, or pharmaceutical industries to enable timer discs to be attached thereto. In this way, the amount of time that materials stored within such containers may be easily and accurately tracked. In this regard, it should be noted that the timer discs described herein can be used to track the amount of time any item has been stored, whether perishable or non-perishable, and that the applicability of the above-described timer discs and storage containers is not limited to food storage only.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A storage container, comprising:
    a lid comprising a top surface having a circular recess formed thereon and one or more first mating elements disposed within the circular recess; and
    a timer disc that is removably attachable to the lid, the timer disc comprising:
        a housing that encapsulates a display, a microcontroller, and a battery; and
        one or more second mating elements;
    wherein the timer disc is manipulable to cause the one or more second mating elements to engage with the one or more first mating elements, thereby securing the timer disc to the lid; and
    wherein manipulation of the timer disc to cause the one or more second mating elements to engage with the one or more first mating elements also causes an electrical connection to be made between the battery and each of the microcontroller and the display, thereby activating the microcontroller and the display.

2. The storage container of claim 1, wherein:
    the one or more first mating elements comprises one or more teeth that extend from a cylindrical stand formed on a center of the circular recess;
    the one or more second mating elements comprise one or more sliding channels formed in an internal edge of a circular aperture in a bottom of the timer disc and accessible from the bottom of the timer disc via one or more corresponding grooves;
    the engagement of the one or more first mating elements with the one or more second mating elements comprises insertion of each of the one or more teeth into a corresponding one of the one or more grooves and then turning the timer disc so that each of the one or more teeth slides along a corresponding one of the one or more sliding channels; and the insertion of each of the one or more teeth into the corresponding one of the one or more grooves causes a button that is disposed within the circular aperture in the bottom of the timer disc to be pressed by the cylindrical stand, thereby completing a circuit that interconnects the battery with each of the microcontroller and the display.

3. The storage container of claim 1, wherein:

the one or more first mating elements comprises one or more teeth that extend from an internal edge of the circular recess;

the one or more second mating elements comprise one or more sliding channels formed in an external edge of the timer disc and accessible from a bottom of the timer disc via one or more corresponding grooves;

the engagement of the one or more first mating elements with the one or more second mating elements comprises insertion of each of the one or more teeth into a corresponding one of the one or more grooves and then turning the timer disc so that each of the one or more teeth slides along a corresponding one of the one or more sliding channels; and the insertion of each of the one or more teeth into the corresponding one of the one or more grooves causes a button that is disposed within the circular aperture in the bottom of the timer disc to be pressed, thereby completing a circuit that interconnects the battery with each of the microcontroller and the display.

4. The storage container of claim 1, wherein:

the one or more first mating elements comprises a cylindrical stand formed on the center of the circular recess;

the one or more second mating elements comprise a circular aperture in a bottom of the timer disc; and the engagement of the one or more first mating elements with the one or more second mating elements comprises insertion of the cylindrical stand into the circular aperture, thereby causing a snug fit between the lid and the bottom of the timer disc; and the insertion of the cylindrical stand into the circular aperture causes a button that is disposed within the circular aperture in the bottom of the timer disc to be pressed, thereby completing a circuit that interconnects the battery with each of the microcontroller and the display.

5. The storage container of claim 1, wherein:

the one or more first mating elements comprises a cylindrical stand formed on the center of the circular recess and a metal inset disposed in the circular recess;

the one or more second mating elements comprise a circular aperture in a bottom of the timer disc and a ring magnet that surrounds the circular aperture;

the engagement of the one or more first mating elements with the one or more second mating elements comprises insertion of the cylindrical stand into the circular aperture and the forming of a magnetic connection between the ring magnet and the metal inset; and the insertion of the cylindrical stand into the circular aperture causes a button that is disposed within the circular aperture in the bottom of the timer disc to be pressed, thereby completing a circuit that interconnects the battery with each of the microcontroller and the display.

6. The storage container of claim 1, wherein:

the one or more first mating elements comprises a cylindrical stand formed on the center of the circular recess and a first thread disposed around an internal edge of the circular recess;

the one or more second mating elements comprise a circular aperture in a bottom of the timer disc and a second thread disposed around an external edge of the timer disc;

the engagement of the one or more first mating elements with the one or more second mating elements comprises insertion of the cylindrical stand into the circular aperture and the rotational engagement of the first thread with the second thread; and the insertion of the cylindrical stand into the circular aperture causes a button that is disposed within the circular aperture in the bottom of the timer disc to be pressed, thereby completing a circuit that interconnects the battery with each of the microcontroller and the display.

7. The storage container of claim 1, wherein the circular recess comprises a depression formed in the top surface of the lid.

8. The storage container of claim 1, wherein the circular recess comprises a recess in a pop button that extends from the top surface of the lid.

9. The storage container of claim 1, wherein the display comprises a liquid-crystal display (LCD).

10. The storage container of claim 1, wherein, when activated, the microcontroller controls the display to display one or more of:

an elapsed time since the timer disc was activated;
a current date;
a current time;
a temperature;
a battery life indicator associated with the battery; or
an indicator associated with a wireless signal or a wireless connection between the timer disc and an external device or network.

11. The storage container of claim 1, wherein the timer disc further comprises a Bluetooth transceiver that is connected to the microcontroller and that enables Bluetooth communication with an external device.

12. The storage container of claim 11, wherein the Bluetooth transceiver is operable to communicate with a bridge device that enables communication between the timer disc and at least one device on a network.

13. The storage container of claim 11, wherein the timer disc communicates one or more of the following items of information to the external device:

an elapsed time since activation of the timer disc;
information concerning contents of the storage container; or
information concerning a state of the battery.

14. The storage container of claim 1, wherein:

the one or more first mating elements comprises a channel within a sidewall of the circular recess;

the one or more second mating elements comprise an elastic ring that surrounds an external edge of the timer disc;

the housing of the timer disc comprises a bottom housing and a top housing that is rotatably connectable to the bottom housing via a threaded connection therebetween;

the elastic ring is disposed between the bottom housing and the top housing such that when the timer disc is inserted within the circular recess and the top housing is rotated onto the bottom housing via the threaded connection therebetween, the elastic ring is caused to expand outward into the channel, thereby securing the timer disc to the lid; and the rotation of the top housing onto the bottom housing via the threaded connection causes electrical contacts disposed on the top housing to form an electrical connection with electrical contacts disposed on the bottom housing, thereby completing a circuit that interconnects the battery with each of the microcontroller and the display.

15. The storage container of claim 14, wherein the lid comprises one or more knobs that protrude from a bottom of the circular recess and are insertable into one or more recesses in the bottom housing of the timer disc, respectively, thereby interlocking the lid and the bottom housing and enabling rotation of the top housing relative to both the lid and the bottom housing.

16. The storage container of claim 15, wherein a first degree of rotation of the top housing off of the bottom housing causes the circuit that interconnects the battery with each of the microcontroller and the display to be broken and also causes the elastic ring to contract thereby enabling the timer disc to be removed from the circular recess.

17. The storage container of claim 16, wherein a second degree of rotation of the top housing off the bottom housing enables the top housing to be removed from the bottom housing, thereby facilitating replacement of the battery.

18. A timer disc adapted to be connected to a lid of a storage container, the timer disc comprising:

a housing that encapsulates a display, a microcontroller, and a battery; and one or more first mating elements;

wherein the timer disc is manipulable to cause the one or more first mating elements to engage with one or more second mating elements disposed within a circular recess on a top surface of the lid, thereby securing the timer disc to the lid; and wherein manipulation of the timer disc to cause the one or more first mating elements to engage with the one or more second mating elements also causes an electrical connection to be made between the battery and each of the microcontroller and the display, thereby activating the microcontroller and the display.

19. The timer disc of claim 18, further comprising:

a light sensor, wherein one or more functions of the display are disabled when the light sensor senses that it is dark and wherein the one or more functions of the display are reactivated when the light sensor senses that it is light.

20. A system for attaching a timer disc to a container, comprising:

a base comprising a circular tray within which are disposed one or more first mating elements, a bottom of the tray comprising an adhesive layer that enables the base to be attached to the container; and a timer disc that is removably attachable to the base, the timer disc comprising:

a housing that encapsulates a display, a microcontroller, and a battery; and one or more second mating elements;

wherein the timer disc is manipulable to cause the one or more second mating elements to engage with the one or more first mating elements, thereby securing the timer disc to the base; and wherein manipulation of the timer disc to cause the one or more second mating elements to engage with the one or more first mating elements also causes an electrical connection to be made between the battery and each of the microcontroller and the display, thereby activating the microcontroller and the display.

* * * * *